United States Patent
Hong et al.

(10) Patent No.: US 8,225,261 B2
(45) Date of Patent: Jul. 17, 2012

(54) METHODS FOR DEFINING CONTACT GRID IN DYNAMIC ARRAY ARCHITECTURE

(75) Inventors: Joseph Hong, Chandler, AZ (US); Stephen Kornachuk, San Jose, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 525 days.

(21) Appl. No.: 12/399,948

(22) Filed: Mar. 7, 2009

(65) Prior Publication Data
US 2009/0228853 A1    Sep. 10, 2009

Related U.S. Application Data

(63) Continuation-in-part of application No. 12/212,562, filed on Sep. 17, 2008, now Pat. No. 7,842,975, which is a continuation-in-part of application No. 12/013,342, filed on Jan. 11, 2008, now Pat. No. 7,917,879, which is a continuation of application No. 11/683,402, filed on Mar. 7, 2007, now Pat. No. 7,446,352.

(60) Provisional application No. 61/034,927, filed on Mar. 7, 2008, provisional application No. 60/963,364, filed on Aug. 2, 2007, provisional application No. 60/972,394, filed on Sep. 14, 2007, provisional application No. 60/781,288, filed on Mar. 9, 2006.

(51) Int. Cl.
*G06F 17/50* (2006.01)
(52) U.S. Cl. .......................... 716/122; 716/119; 716/135
(58) Field of Classification Search .................. None
See application file for complete search history.

(56) References Cited

U.S. PATENT DOCUMENTS

| 4,197,555 A | 4/1980 | Uehara et al. |
| 4,417,161 A | 11/1983 | Uya |
| 4,424,460 A | 1/1984 | Best |
| 4,682,202 A | 7/1987 | Tanizawa |

(Continued)

FOREIGN PATENT DOCUMENTS

EP    1394858    3/2004

(Continued)

OTHER PUBLICATIONS

U.S. Appl. No. 60/625,342, filed May 25, 2006, Pileggi et al.

(Continued)

*Primary Examiner* — Leigh Garbowski
(74) *Attorney, Agent, or Firm* — Martine Penilla Group, LLP

(57) ABSTRACT

First and second virtual grates are defined as respective sets of parallel virtual lines extending across a layout area in first and second perpendicular directions, respectively. The virtual lines of the first and second virtual grates correspond to placement locations for layout features in lower and higher chip levels, respectively. Each intersection point between virtual lines of the first and second virtual grates is a gridpoint within a vertical connection placement grid. Vertical connection structures are placed at a number of gridpoints within the vertical connection placement grid so as to provide electrical connectivity between layout features in the lower and higher chip levels. The vertical connection structures are placed so as to minimize a number of different spacing sizes between neighboring vertical connection structures across the vertical connection placement grid, while simultaneously minimizing to an extent possible layout area size. The vertical connection structures may be contacts or vias.

29 Claims, 11 Drawing Sheets

U.S. PATENT DOCUMENTS

| | | | |
|---|---|---|---|
| 4,801,986 A | 1/1989 | Chang et al. | |
| 5,097,422 A * | 3/1992 | Corbin et al. | 716/52 |
| 5,121,186 A | 6/1992 | Wong et al. | |
| 5,208,765 A | 5/1993 | Turnbull | |
| 5,224,057 A | 6/1993 | Igarashi | |
| 5,242,770 A | 9/1993 | Chen et al. | |
| 5,378,649 A | 1/1995 | Huang | |
| 5,471,403 A | 11/1995 | Fujimaga | |
| 5,497,334 A | 3/1996 | Russell et al. | |
| 5,497,337 A | 3/1996 | Ponnapalli et al. | |
| 5,581,098 A | 12/1996 | Chang | |
| 5,636,002 A | 6/1997 | Garofalo | |
| 5,682,323 A | 10/1997 | Pasch et al. | |
| 5,684,733 A | 11/1997 | Wu et al. | |
| 5,705,301 A | 1/1998 | Garza et al. | |
| 5,723,883 A | 3/1998 | Gheewalla | |
| 5,740,068 A | 4/1998 | Liebmann et al. | |
| 5,745,374 A | 4/1998 | Matsumoto | |
| 5,774,367 A | 6/1998 | Reyes et al. | |
| 5,790,417 A | 8/1998 | Chao et al. | |
| 5,796,624 A | 8/1998 | Sridhar et al. | |
| 5,825,203 A | 10/1998 | Kusunoki et al. | |
| 5,838,594 A | 11/1998 | Kojima | |
| 5,841,663 A | 11/1998 | Sharma et al. | |
| 5,847,421 A | 12/1998 | Yamaguchi | |
| 5,852,562 A | 12/1998 | Shinomiya et al. | |
| 5,858,580 A | 1/1999 | Wang et al. | |
| 5,898,194 A | 4/1999 | Gheewala | |
| 5,900,340 A | 5/1999 | Reich et al. | |
| 5,908,827 A | 6/1999 | Sirna | |
| 5,923,059 A | 7/1999 | Gheewala | |
| 5,929,469 A | 7/1999 | Mimoto et al. | |
| 5,935,763 A | 8/1999 | Caterer et al. | |
| 5,973,507 A | 10/1999 | Yamazaki | |
| 5,977,305 A | 11/1999 | Wigler et al. | |
| 6,009,251 A | 12/1999 | Ho et al. | |
| 6,026,223 A | 2/2000 | Scepanovic et al. | |
| 6,037,617 A | 3/2000 | Kumagai | |
| 6,044,007 A | 3/2000 | Capodieci | |
| 6,063,132 A | 5/2000 | DeCamp et al. | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A | 9/2000 | Chen et al. | |
| 6,166,415 A | 12/2000 | Sakemi et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,262,487 B1 | 7/2001 | Igarashi et al. | |
| 6,269,472 B1 | 7/2001 | Garza et al. | |
| 6,275,973 B1 | 8/2001 | Wein | |
| 6,282,696 B1 | 8/2001 | Garza et al. | |
| 6,303,252 B1 | 10/2001 | Lin | |
| 6,331,733 B1 | 12/2001 | Or-Bach et al. | |
| 6,335,250 B1 | 1/2002 | Egi | |
| 6,338,972 B1 | 1/2002 | Sudhindranath et al. | |
| 6,356,112 B1 | 3/2002 | Tran et al. | |
| 6,370,679 B1 | 4/2002 | Chang et al. | |
| 6,378,110 B1 | 4/2002 | Ho | |
| 6,388,296 B1 | 5/2002 | Hsu | |
| 6,393,601 B1 | 5/2002 | Tanaka et al. | |
| 6,415,421 B2 | 7/2002 | Anderson et al. | |
| 6,416,907 B1 | 7/2002 | Winder et al. | |
| 6,421,820 B1 | 7/2002 | Mansfield et al. | |
| 6,425,112 B1 | 7/2002 | Bula et al. | |
| 6,425,117 B1 | 7/2002 | Pasch et al. | |
| 6,426,269 B1 | 7/2002 | Haffner et al. | |
| 6,436,805 B2 | 8/2002 | Trivedi | |
| 6,470,489 B1 | 10/2002 | Chang et al. | |
| 6,476,493 B2 | 11/2002 | Or-Bach et al. | |
| 6,477,695 B1 | 11/2002 | Gandhi | |
| 6,480,989 B2 | 11/2002 | Chan et al. | |
| 6,492,066 B1 | 12/2002 | Capodieci et al. | |
| 6,496,965 B1 | 12/2002 | van Ginneken et al. | |
| 6,505,327 B2 | 1/2003 | Lin | |
| 6,505,328 B1 | 1/2003 | van Ginneken et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | |
| 6,536,028 B1 | 3/2003 | Katsioulas et al. | |
| 6,543,039 B1 | 4/2003 | Watanabe | |
| 6,553,544 B2 | 4/2003 | Tanaka et al. | |
| 6,553,559 B2 | 4/2003 | Liebmann et al. | |
| 6,553,562 B2 | 4/2003 | Capodieci et al. | |
| 6,571,140 B1 | 5/2003 | Wewalaarachchi | |
| 6,571,379 B2 | 5/2003 | Takayama | |
| 6,578,190 B2 | 6/2003 | Ferguson et al. | |
| 6,588,005 B1 | 7/2003 | Kobayashi et al. | |
| 6,590,289 B2 | 7/2003 | Shively | |
| 6,591,207 B2 | 7/2003 | Naya et al. | |
| 6,609,235 B2 | 8/2003 | Ramaswamy et al. | |
| 6,610,607 B1 | 8/2003 | Armbrust et al. | |
| 6,620,561 B2 | 9/2003 | Winder et al. | |
| 6,633,182 B2 | 10/2003 | Pileggi et al. | |
| 6,635,935 B2 | 10/2003 | Makino | |
| 6,643,831 B2 | 11/2003 | Chang et al. | |
| 6,650,014 B2 | 11/2003 | Kariyazaki | |
| 6,661,041 B2 | 12/2003 | Keeth | |
| 6,662,350 B2 | 12/2003 | Fried et al. | |
| 6,673,638 B1 | 1/2004 | Bendik et al. | |
| 6,687,895 B2 | 2/2004 | Zhang | |
| 6,691,297 B1 | 2/2004 | Misaka et al. | |
| 6,700,405 B1 | 3/2004 | Hirairi | |
| 6,703,170 B1 | 3/2004 | Pindo | |
| 6,714,903 B1 | 3/2004 | Chu et al. | |
| 6,732,338 B2 | 5/2004 | Crouse et al. | |
| 6,737,199 B1 | 5/2004 | Hsieh | |
| 6,737,347 B1 | 5/2004 | Houston et al. | |
| 6,745,372 B2 | 6/2004 | Cote et al. | |
| 6,745,380 B2 | 6/2004 | Bodendorf et al. | |
| 6,749,972 B2 | 6/2004 | Yu | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 | 8/2004 | Samuels | |
| 6,789,244 B1 | 9/2004 | Dasasathyan et al. | |
| 6,789,246 B1 | 9/2004 | Mohan et al. | |
| 6,792,593 B2 | 9/2004 | Takashima et al. | |
| 6,794,914 B2 | 9/2004 | Sani et al. | |
| 6,795,952 B1 | 9/2004 | Stine et al. | |
| 6,795,953 B2 | 9/2004 | Bakarian et al. | |
| 6,807,663 B2 | 10/2004 | Cote et al. | |
| 6,819,136 B2 | 11/2004 | Or-Bach | |
| 6,826,738 B2 | 11/2004 | Cadouri | |
| 6,834,375 B1 | 12/2004 | Stine et al. | |
| 6,841,880 B2 | 1/2005 | Matsumoto et al. | |
| 6,850,854 B2 | 2/2005 | Naya et al. | |
| 6,854,096 B2 | 2/2005 | Eaton et al. | |
| 6,854,100 B1 | 2/2005 | Chuang et al. | |
| 6,877,144 B1 | 4/2005 | Rittman et al. | |
| 6,884,712 B2 | 4/2005 | Yelehanka et al. | |
| 6,898,770 B2 | 5/2005 | Boluki et al. | |
| 6,904,582 B1 | 6/2005 | Rittman et al. | |
| 6,918,104 B2 | 7/2005 | Pierrat et al. | |
| 6,920,079 B2 | 7/2005 | Shibayama | |
| 6,928,635 B2 | 8/2005 | Pramanik et al. | |
| 6,931,617 B2 | 8/2005 | Sanie et al. | |
| 6,953,956 B2 | 10/2005 | Or-Bach et al. | |
| 6,954,918 B2 | 10/2005 | Houston | |
| 6,957,402 B2 | 10/2005 | Templeton et al. | |
| 6,968,527 B2 | 11/2005 | Pierrat | |
| 6,978,436 B2 | 12/2005 | Cote et al. | |
| 6,978,437 B1 | 12/2005 | Rittman et al. | |
| 6,992,394 B2 | 1/2006 | Park | |
| 6,992,925 B2 | 1/2006 | Peng | |
| 6,993,741 B2 | 1/2006 | Liebmann et al. | |

| | | | |
|---|---|---|---|
| 6,994,939 B1 | 2/2006 | Ghandehari et al. | |
| 7,016,214 B2 | 3/2006 | Kawamata | |
| 7,028,285 B2 | 4/2006 | Cote et al. | |
| 7,041,568 B2 | 5/2006 | Goldbach et al. | |
| 7,052,972 B2 | 5/2006 | Sandhu et al. | |
| 7,063,920 B2 | 6/2006 | Baba-Ali | |
| 7,064,068 B2 | 6/2006 | Chou et al. | |
| 7,065,731 B2 | 6/2006 | Jacques et al. | |
| 7,079,989 B2 | 7/2006 | Wimer | |
| 7,093,208 B2 | 8/2006 | Williams et al. | |
| 7,093,228 B2 | 8/2006 | Andreev et al. | |
| 7,103,870 B2 | 9/2006 | Misaka et al. | |
| 7,105,871 B2 | 9/2006 | Or-Bach et al. | |
| 7,107,551 B1 | 9/2006 | de Dood et al. | |
| 7,115,343 B2 | 10/2006 | Gordon et al. | |
| 7,115,920 B2 | 10/2006 | Bernstein et al. | |
| 7,120,882 B2 | 10/2006 | Kotani et al. | |
| 7,124,386 B2 | 10/2006 | Smith et al. | |
| 7,132,203 B2 | 11/2006 | Pierrat | |
| 7,137,092 B2 | 11/2006 | Maeda | |
| 7,149,999 B2 | 12/2006 | Kahng et al. | |
| 7,152,215 B2 | 12/2006 | Smith et al. | |
| 7,155,685 B2 | 12/2006 | Mori et al. | |
| 7,155,689 B2 | 12/2006 | Pierrat | |
| 7,159,197 B2 | 1/2007 | Falbo et al. | |
| 7,174,520 B2 | 2/2007 | White et al. | |
| 7,175,940 B2 | 2/2007 | Laidig et al. | |
| 7,185,294 B2 | 2/2007 | Zhang | |
| 7,188,322 B2 | 3/2007 | Cohn et al. | |
| 7,194,712 B2 | 3/2007 | Wu | |
| 7,200,835 B2 | 4/2007 | Zhang et al. | |
| 7,202,517 B2 | 4/2007 | Dixit et al. | |
| 7,219,326 B2 | 5/2007 | Reed et al. | |
| 7,225,423 B2 | 5/2007 | Bhattacharya et al. | |
| 7,227,183 B2 | 6/2007 | Donze et al. | |
| 7,231,628 B2 | 6/2007 | Pack et al. | |
| 7,235,424 B2 | 6/2007 | Chen et al. | |
| 7,243,316 B2 | 7/2007 | White et al. | |
| 7,252,909 B2 | 8/2007 | Shin et al. | |
| 7,264,990 B2 | 9/2007 | Rueckes et al. | |
| 7,278,118 B2 | 10/2007 | Pileggi et al. | |
| 7,287,320 B2 | 10/2007 | Wang et al. | |
| 7,294,534 B2 | 11/2007 | Iwaki | |
| 7,302,651 B2 | 11/2007 | Allen et al. | |
| 7,308,669 B2 | 12/2007 | Buehler et al. | |
| 7,335,966 B2 | 2/2008 | Ihme et al. | |
| 7,337,421 B2 | 2/2008 | Kamat | |
| 7,338,896 B2 | 3/2008 | Vanhaelemeersch et al. | |
| 7,346,885 B2 | 3/2008 | Semmler | |
| 7,350,183 B2 | 3/2008 | Cui et al. | |
| 7,353,492 B2 | 4/2008 | Gupta et al. | |
| 7,360,179 B2 | 4/2008 | Smith et al. | |
| 7,360,198 B2 | 4/2008 | Rana et al. | |
| 7,366,997 B1 | 4/2008 | Rahmat et al. | |
| 7,367,008 B2 | 4/2008 | White et al. | |
| 7,376,931 B2 * | 5/2008 | Kokubun | 430/5 |
| 7,383,521 B2 | 6/2008 | Smith et al. | |
| 7,397,260 B2 | 7/2008 | Chanda et al. | |
| 7,400,627 B2 | 7/2008 | Wu et al. | |
| 7,404,173 B2 | 7/2008 | Wu et al. | |
| 7,411,252 B2 | 8/2008 | Anderson et al. | |
| 7,421,678 B2 | 9/2008 | Barnes et al. | |
| 7,423,298 B2 | 9/2008 | Mariyama et al. | |
| 7,424,694 B2 | 9/2008 | Ikeda | |
| 7,426,710 B2 | 9/2008 | Zhang et al. | |
| 7,434,185 B2 | 10/2008 | Dooling et al. | |
| 7,441,211 B1 | 10/2008 | Gupta et al. | |
| 7,444,609 B2 | 10/2008 | Charlebois et al. | |
| 7,446,352 B2 | 11/2008 | Becker et al. | |
| 7,449,371 B2 | 11/2008 | Kemerling et al. | |
| 7,458,045 B2 | 11/2008 | Cote et al. | |
| 7,459,792 B2 | 12/2008 | Chen | |
| 7,465,973 B2 | 12/2008 | Chang et al. | |
| 7,466,607 B2 | 12/2008 | Hollis et al. | |
| 7,480,880 B2 | 1/2009 | Visweswariah et al. | |
| 7,480,891 B2 | 1/2009 | Sezginer | |
| 7,484,197 B2 | 1/2009 | Allen et al. | |
| 7,487,475 B1 | 2/2009 | Kriplani et al. | |
| 7,506,300 B2 | 3/2009 | Sezginer et al. | |
| 7,509,621 B2 | 3/2009 | Melvin, III | |
| 7,509,622 B2 | 3/2009 | Sinha et al. | |
| 7,512,921 B2 | 3/2009 | Shibuya | |
| 7,514,959 B2 | 4/2009 | Or-Bach et al. | |
| 7,523,429 B2 | 4/2009 | Kroyan et al. | |
| 7,527,900 B2 | 5/2009 | Zhou et al. | |
| 7,563,701 B2 | 7/2009 | Chang et al. | |
| 7,568,174 B2 | 7/2009 | Sezginer et al. | |
| 7,569,310 B2 | 8/2009 | Wallace et al. | |
| 7,614,030 B2 | 11/2009 | Hsu | |
| 7,632,610 B2 | 12/2009 | Wallace et al. | |
| 7,665,051 B2 | 2/2010 | Ludwig et al. | |
| 7,712,056 B2 | 5/2010 | White et al. | |
| 7,770,144 B2 | 8/2010 | Dellinger | |
| 7,802,219 B2 | 9/2010 | Tomar et al. | |
| 7,825,437 B2 | 11/2010 | Pillarisetty et al. | |
| 7,842,975 B2 | 11/2010 | Becker et al. | |
| 7,882,456 B2 | 2/2011 | Zach | |
| 7,888,705 B2 | 2/2011 | Becker et al. | |
| 7,898,040 B2 | 3/2011 | Nawaz | |
| 7,908,578 B2 | 3/2011 | Becker et al. | |
| 7,910,958 B2 | 3/2011 | Becker et al. | |
| 7,917,877 B2 | 3/2011 | Singh et al. | |
| 7,917,879 B2 | 3/2011 | Becker et al. | |
| 7,923,266 B2 | 4/2011 | Thijs et al. | |
| 7,923,337 B2 | 4/2011 | Chang et al. | |
| 7,932,545 B2 | 4/2011 | Becker et al. | |
| 7,962,867 B2 | 6/2011 | White et al. | |
| 7,964,267 B1 | 6/2011 | Lyons et al. | |
| 7,971,160 B2 | 6/2011 | Osawa et al. | |
| 7,992,122 B1 | 8/2011 | Burstein et al. | |
| 7,994,583 B2 | 8/2011 | Inaba | |
| 8,004,042 B2 | 8/2011 | Yang et al. | |
| 8,058,671 B2 | 11/2011 | Becker et al. | |
| 2002/0015899 A1 | 2/2002 | Chen et al. | |
| 2002/0079927 A1 | 6/2002 | Katoh et al. | |
| 2002/0166107 A1 | 11/2002 | Capodieci et al. | |
| 2003/0042930 A1 | 3/2003 | Pileggi et al. | |
| 2003/0046653 A1 | 3/2003 | Liu | |
| 2003/0061592 A1 | 3/2003 | Agrawal et al. | |
| 2003/0088839 A1 | 5/2003 | Watanabe | |
| 2003/0088842 A1 | 5/2003 | Cirit | |
| 2003/0106037 A1 | 6/2003 | Moniwa et al. | |
| 2003/0145299 A1 | 7/2003 | Fried et al. | |
| 2003/0177465 A1 | 9/2003 | MacLean et al. | |
| 2003/0229868 A1 | 12/2003 | White et al. | |
| 2003/0229875 A1 | 12/2003 | Smith et al. | |
| 2004/0049754 A1 | 3/2004 | Liao et al. | |
| 2004/0063038 A1 | 4/2004 | Shin et al. | |
| 2004/0115539 A1 | 6/2004 | Broeke et al. | |
| 2004/0139412 A1 | 7/2004 | Ito et al. | |
| 2004/0145028 A1 | 7/2004 | Matsumoto et al. | |
| 2004/0153979 A1 | 8/2004 | Chang | |
| 2004/0161878 A1 | 8/2004 | Or-Bach et al. | |
| 2004/0229135 A1 | 11/2004 | Wang et al. | |
| 2004/0243966 A1 | 12/2004 | Dellinger | |
| 2005/0055828 A1 | 3/2005 | Wang et al. | |
| 2005/0087806 A1 | 4/2005 | Hokazono | |
| 2005/0093147 A1 | 5/2005 | Tu | |
| 2005/0101112 A1 | 5/2005 | Rueckes et al. | |
| 2005/0136340 A1 | 6/2005 | Baselmans et al. | |
| 2005/0138598 A1 * | 6/2005 | Kokubun | 716/20 |
| 2005/0185325 A1 | 8/2005 | Hur | |
| 2005/0189614 A1 | 9/2005 | Ihme et al. | |
| 2005/0196685 A1 | 9/2005 | Wang et al. | |
| 2005/0224982 A1 | 10/2005 | Kemerling et al. | |
| 2005/0229130 A1 | 10/2005 | Wu et al. | |
| 2005/0251771 A1 | 11/2005 | Robles | |
| 2005/0268256 A1 | 12/2005 | Tsai et al. | |
| 2006/0063334 A1 | 3/2006 | Donze et al. | |
| 2006/0070018 A1 | 3/2006 | Semmler | |
| 2006/0084261 A1 | 4/2006 | Iwaki | |
| 2006/0101370 A1 | 5/2006 | Cui et al. | |
| 2006/0112355 A1 | 5/2006 | Pileggi et al. | |
| 2006/0121715 A1 | 6/2006 | Chang et al. | |
| 2006/0125024 A1 | 6/2006 | Ishigaki | |
| 2006/0151810 A1 | 7/2006 | Ohshige | |
| 2006/0158270 A1 | 7/2006 | Gibet et al. | |
| 2006/0177744 A1 | 8/2006 | Bodendorf et al. | |

| | | |
|---|---|---|
| 2006/0181310 A1 | 8/2006 | Rhee |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0196958 A1 | 8/2007 | Bhattacharya et al. |
| 2007/0209029 A1 | 9/2007 | Ivonin et al. |
| 2007/0210391 A1 | 9/2007 | Becker |
| 2007/0234252 A1 | 10/2007 | Visweswariah et al. |
| 2007/0256039 A1 | 11/2007 | White |
| 2007/0274140 A1 | 11/2007 | Joshi et al. |
| 2007/0290361 A1 | 12/2007 | Chen |
| 2007/0294652 A1 | 12/2007 | Bowen |
| 2008/0005712 A1 | 1/2008 | Charlebois et al. |
| 2008/0046846 A1 | 2/2008 | Chew et al. |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0216207 A1 | 9/2008 | Tsai |
| 2008/0244494 A1 | 10/2008 | McCullen |
| 2008/0276105 A1 | 11/2008 | Hoberman et al. |
| 2008/0283910 A1 | 11/2008 | Dreeskornfeld et al. |
| 2008/0308848 A1 | 12/2008 | Inaba |
| 2009/0014811 A1 | 1/2009 | Becker |
| 2009/0024974 A1 | 1/2009 | Yamada |
| 2009/0031261 A1 | 1/2009 | Smith et al. |
| 2009/0032898 A1 | 2/2009 | Becker |
| 2009/0032967 A1 | 2/2009 | Becker |
| 2009/0037864 A1 | 2/2009 | Becker |
| 2009/0077524 A1 | 3/2009 | Nagamura |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0224408 A1 | 9/2009 | Fox |
| 2009/0228853 A1 | 9/2009 | Hong et al. |
| 2009/0280582 A1 | 11/2009 | Thijs et al. |
| 2009/0302372 A1 | 12/2009 | Chang et al. |
| 2010/0001321 A1 | 1/2010 | Becker |
| 2010/0006897 A1 | 1/2010 | Becker |
| 2010/0006898 A1 | 1/2010 | Becker |
| 2010/0006899 A1 | 1/2010 | Becker |
| 2010/0006900 A1 | 1/2010 | Becker |
| 2010/0006901 A1 | 1/2010 | Becker |
| 2010/0006902 A1 | 1/2010 | Becker |
| 2010/0006903 A1 | 1/2010 | Becker |
| 2010/0006947 A1 | 1/2010 | Becker |
| 2010/0006948 A1 | 1/2010 | Becker |
| 2010/0006950 A1 | 1/2010 | Becker |
| 2010/0006951 A1 | 1/2010 | Becker |
| 2010/0006986 A1 | 1/2010 | Becker |
| 2010/0011327 A1 | 1/2010 | Becker |
| 2010/0011328 A1 | 1/2010 | Becker |
| 2010/0011329 A1 | 1/2010 | Becker |
| 2010/0011330 A1 | 1/2010 | Becker |
| 2010/0011331 A1 | 1/2010 | Becker |
| 2010/0011332 A1 | 1/2010 | Becker |
| 2010/0011333 A1 | 1/2010 | Becker |
| 2010/0012981 A1 | 1/2010 | Becker |
| 2010/0012982 A1 | 1/2010 | Becker |
| 2010/0012983 A1 | 1/2010 | Becker |
| 2010/0012984 A1 | 1/2010 | Becker |
| 2010/0012985 A1 | 1/2010 | Becker |
| 2010/0012986 A1 | 1/2010 | Becker |
| 2010/0017766 A1 | 1/2010 | Becker |
| 2010/0017767 A1 | 1/2010 | Becker |
| 2010/0017768 A1 | 1/2010 | Becker |
| 2010/0017769 A1 | 1/2010 | Becker |
| 2010/0017770 A1 | 1/2010 | Becker |
| 2010/0017771 A1 | 1/2010 | Becker |
| 2010/0017772 A1 | 1/2010 | Becker |
| 2010/0019280 A1 | 1/2010 | Becker |
| 2010/0019281 A1 | 1/2010 | Becker |
| 2010/0019282 A1 | 1/2010 | Becker |
| 2010/0019283 A1 | 1/2010 | Becker |
| 2010/0019284 A1 | 1/2010 | Becker |
| 2010/0019285 A1 | 1/2010 | Becker |
| 2010/0019286 A1 | 1/2010 | Becker |
| 2010/0019287 A1 | 1/2010 | Becker |
| 2010/0019288 A1 | 1/2010 | Becker |
| 2010/0019308 A1 | 1/2010 | Chan et al. |
| 2010/0023906 A1 | 1/2010 | Becker |
| 2010/0023907 A1 | 1/2010 | Becker |
| 2010/0023908 A1 | 1/2010 | Becker |
| 2010/0023911 A1 | 1/2010 | Becker |
| 2010/0025731 A1 | 2/2010 | Becker |
| 2010/0025732 A1 | 2/2010 | Becker |
| 2010/0025733 A1 | 2/2010 | Becker |
| 2010/0025734 A1 | 2/2010 | Becker |
| 2010/0025735 A1 | 2/2010 | Becker |
| 2010/0025736 A1 | 2/2010 | Becker |
| 2010/0032721 A1 | 2/2010 | Becker |
| 2010/0032722 A1 | 2/2010 | Becker |
| 2010/0032723 A1 | 2/2010 | Becker |
| 2010/0032724 A1 | 2/2010 | Becker |
| 2010/0032726 A1 | 2/2010 | Becker |
| 2010/0037194 A1 | 2/2010 | Becker |
| 2010/0037195 A1 | 2/2010 | Becker |
| 2010/0096671 A1 | 4/2010 | Becker |
| 2010/0203689 A1 | 8/2010 | Bernstein et al. |
| 2010/0232212 A1 | 9/2010 | Anderson et al. |
| 2010/0264468 A1 | 10/2010 | Xu |
| 2010/0287518 A1 | 11/2010 | Becker |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2012/0012932 A1 | 1/2012 | Perng et al. |

FOREIGN PATENT DOCUMENTS

| | | |
|---|---|---|
| EP | 1670062 | 6/2006 |
| FR | 2860920 | 4/2005 |
| JP | 10-116911 | 5/1998 |
| JP | 2002-258463 | 9/2002 |
| JP | 2005-259913 | 9/2005 |
| KR | 10-1999-0057943 A | 7/1999 |
| KR | 10-2000-0028830 A | 5/2000 |
| KR | 10-2005-0030347 A | 3/2005 |
| WO | WO 2005/104356 | 11/2005 |
| WO | WO 2006/014849 | 2/2006 |
| WO | WO 2006/052738 | 5/2006 |
| WO | WO 2007/103587 | 9/2007 |

OTHER PUBLICATIONS

Acar, et al., "A Linear-Centric Simulation Framework for Parametric Fluctuations", 2002, IEEE, Carnegie Mellon University USA, pp. 1-8.

Amazawa, et al., "Fully Planarized Four-Level Interconnection with Stacked VLAS Using CMP of Selective CVD-Al and Insulator and its Application to Quarter Micron Gate Array LSIs", 1995, IEEE, Japan, pp. 473-476.

Axelrad et al. "Efficient Full-Chip Yield Analysis Methodology for OPC-Corrected VLSI Design", 2000, International Symposium on Quality Electronic Design (ISQED), 7 pages.

Balasinski et al. "Impact of Subwavelength CD Tolerance on Device Performance", 2002, SPIE, 8 pages.

Burkhardt, et al., "Dark Field Double Dipole Lithography (DDL) for Back-End-Of-Line Processes", 2007, SPIE Proceeding Series, vol. 6520; 65200K, 10 pages.

Capetti, et al., "Sub k1=0.25 Lithography with Double Patterning Technique for 45nm Technology Node Flash Memory Devices at λ=193nm", 2007, SPIE Proceeding Series, vol. 6520; 65202K, 12 pages.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact 8 Patterning with 0.93 NA", 2007, SPIE Proceeding Series, vol. 6520; 65202N, 8 pages.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM, pp. 274-279.

Cobb et al. "Using OPC to Optimize for Image Slope and Improve Process Window", 2003, SPIE, pp. 838-846.

Devgan "Leakage Issues in IC Design: Part 3", 2003, CCAD, 75 pages.

DeVor, et al., "Statistical Quality Design and Control", 1992, Macmillan Publishing Company, pp. 264-267.

Dusa, et al. "Pitch Doubling Through Dual Patterning Lithography Challenges in Integration and Litho Budgets", 2007, SPIE Proceeding Series, vol. 6520; 65200G, 10 pages.

El-Gamal, "Fast, Cheap and Under Control: The Next Implementation Fabric", Jun. 2-6, 2003, ACM Press, pp. 354-355.

Frankel, "Quantum State Control Interference Lithography and Trim Double Patterning for 32-16nm Lithography", 2007, SPIE Proceeding Series, vol. 6520; 65202L, 9 pages.

Garg, et al. "Lithography Driven Layout Design", 2005, IEEE, 6 pages.

Grobman et al. "Reticle Enhancement Technology Trends: Resource and Manufacturability Implications for the Implementation of Physical Designs" Apr. 1-4, 2001, ACM, pp. 45-51.

Grobman et al. "Reticle Enhancement Technology: Implications and Challenges for Physical Design" Jun. 18-22, 2001, ACM, pp. 73-78.

Gupta et al. "Enhanced Resist and Etch CD Control by Design Perturbation", Oct. 4-7, 2006, Society of Photo-Optical Instrumentation Engineers, 12 pages.

Gupta et al. "A Practical Transistor-Level Dual Threshold Voltage Assignment Methodology", 2005, Sixth International Symposium on Quality Electronic Design (ISQED), 6 pages.

Gupta et al. "Detailed Placement for Improved Depth of Focus and CD Control", 2005, ACM, 6 pages.

Gupta et al. "Joining the Design and Mask Flows for Better and Cheaper Masks", Oct. 14-17, 2004, Society of Photo-Optical Instrumentation Engineers.

Gupta et al. "Selective Gate-Length Biasing for Cost-Effective Runtime Leakage Control", Jun. 7-11, 2004, ACM, pp. 327-330.

Gupta et al. "Wafer Topography-Aware Optical Proximity Correction for Better DOF Margin and CD Control", Apr. 13-15, 2005, SPIE.

Hayashida, et al., "Manufacturable Local Interconnect technology Fully Compatible with Titanium Salicide Process", Jun. 11-12, 1991, VMIC Conference.

Heng, et al., "A VLSI Artwork Legalization Technique Base on a New Criterion of Minimum Layout Perturbation", 1997, ACM Press, pp. 116-121.

Heng, et al., "Toward Through-Process Layout Quality Metrics", Mar. 3-4, 2005, Society of Photo-Optical Instrumentation Engineers.

Hu, et al., "Synthesis and Placement Flow for Gain-Based Programmable Regular Fabrics", Apr. 6-9, 2003, ACM Press, pp. 197-203.

Hutton, et al., "A Methodology for FPGA to Structured-ASIC Synthesis and Verification", 2006, EDAA, pp. 64-69.

Intel Core Microarchitecture White Paper "Introducing the 45 nm Next-Generation Intel Core Microarchitecture," 2007, Intel Corporation.

Jayakumar, et al., "A Metal and VIA Maskset Programmable VLSI Design Methodology using PLAs", 2004, IEEE, pp. 590-594.

Jhaveri, T. et al., Maximization of Layout Printability/Manufacturability by Extreme Layout Regularity, Proc. of the SPIE, Apr. 2006.

Kang, S.M., Metal-Metal Matrix (M3) for High-Speed MOS VLSI Layout, IEEE Trans. on CAD, vol. CAD-6, No. 5, Sep. 1987.

Kheterpal, et al., "Design Methodology for IC Manufacturability Based on Regular Logic-Bricks", DAC, Jun. 13-17, 2005, IEEE/AMC, vol. 6520.

Kheterpal, et al., "Routing Architecture Exploration for Regular Fabrics", DAC, Jun. 7-11, 2004, ACM PRESS, pp. 204-207.

Kim, et al., "Double Exposure Using 193nm Negative Tone Photoresist", 2007, SPIE Proceeding Series, vol. 6520; 65202M.

Kim, et al., "Issues and Challenges of Double Patterning Lithography in DRAM", 2007, SPIE Proceeding Series, vol. 6520; 65200H.

Koorapaty, et al., "Exploring Logic Block Granularity for Regular Fabrics", 2004, IEEE, pp. 1-6.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Lavin et al. "Backend DAC Flows for Restrictive Design Rules", 2004, IEEE.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-To-Silicon Solution", IBM Systems and Technology Group, b IBM Research, pp. 1-12.

Liebmann, et al., "High-Performance Circuit Design for the RET-Enabled 65nm Technology Node", Feb. 26-27, 2004, SPIE Proceeding Series, vol. 5379 pp. 20-29.

Liebmann, L. W., Layout Impact of Resolution Enhancement Techniques: Impediment or Opportunity?, International Symposium on Physical Design, 2003.

Liu, et al., "Double Patterning with Multilayer Hard Mask Shrinkage for Sub-0.25 k1 Lithography", 200, SPIE Proceeding Series, vol. 6520; 65202J.

Miller, "Manufacturing-Aware Design Helps Boost IC Yield", Sep. 9, 2004, http://www.eetimes.com/showArticle.jhtml?articleID=47102054.

Mo, et al., "Checkerboard: A Regular Structure and its Synthesis, International Workshop on Logic and Synthesis", 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Fabrics in Deep Sub-Micron Integrated-Circuit Design", 2004, Kluwer Academic Publishers, Entire Book.

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE.

Op de Beek, et al., "Manufacturability issues with Double Patterning for 50nm half pitch damascene applications, using RELACS® shrink and corresponding OPC", 2007, SPIE Proceeding Series, vol. 6520; 652001.

Or-Bach, "Programmable Circuit Fabrics", Sep. 18, 2001, e-ASIC, pp. 1-36.

Otten, et al., "Planning for Performance", DAC 1998, ACM Inc., pp. 122-127.

Pack et al. "Physical & Timing Verification of Subwavelength-Scale Designs-Part I: Lithography Impact on MOSFETs", 2003, SPIE.

Pandini, et al., "Congestion-Aware Logic Synthesis", 2002, IEEE, pp. 1-8.

Pandini, et al., "Understanding and Addressing the Impact of Wiring Congestion During Technology Mapping", ISPD Apr. 7-10, 2002, ACM Press, pp. 131-136.

Patel, et al., "An Architectural Exploration of Via Patterned Gate Arrays, ISPD 2003", Apr. 6, 2003, pp. 184-189.

Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.

Poonawala, et al., "ILT for Double Exposure Lithography with Conventional and Novel Materials", 2007, SPIE Proceeding Series, vol. 6520; 65202Q.

Qian et al. "Advanced Physical Models for Mask Data Verification and Impacts on Physical Layout Synthesis" 2003. IEEE.

Ran, et al., "An Integrated Design Flow for a Via-Configurable Gate Array", 2004, IEEE, pp. 582-589.

Ran, et al., "Designing a Via-Configurable Regular Fabric", Custom Integrated Circuits Conference (CICC). Proceedings of the IEEE, Oct. 1, 2004, pp. 423-426.

Ran, et al., "On Designing Via-Configurable Cell Blocks for Regular Fabrics" Proceedings of the Design Automation Conference (DAC) 2004, Jun. 2004, ACM Press, s 198-203.

Ran, et al., "The Magic of a Via-Configurable Regular Fabric", Proceedings of the IEEE International Conference on Computer Design (ICCD) Oct. 2004.

Ran, et al., "Via-Configurable Routing Architectures and Fast Design Mappability Estimation for Regular Fabrics", 2005, IEEE, pp. 25-32.

Reis, et al., "Physical Design Methodologies for Performance Predictability and Manufacturability", Apr. 14-16, 2004, ACM PRESS, pp. 390-397.

Robertson, et al., "The Modeling of Double Patterning Lithographic Processes", 2007, SPIE Proceeding Series, vol. 6520; 65200J.

Rovner, "Design for Manufacturability in Via Programmable Gate Arrays", May 2003, Graduate School of Carnegie Mellon University.

Sengupta, "An Integrated CAD Framework Linking VLSI Layout Editors and Process Simulators", 1998, Thesis for Rice University, pp. 1-101.

Sengupta, et al., "An Integrated CAD Framework Linking VLSI Layout Editors and Process Simulators", 1996, SPIE Proceeding Series, vol. 2726; pp. 244-252.

Sherlekar, "Design Considerations for Regular Fabrics", Apr. 18-21, 2004, ACM Press, pp. 97-102.

Sreedhar et al. "Statistical Yield Modeling for Sub-Wavelength Lithography", 2008, IEEE.

Stapper, "Modeling of Defects in Integrated Circuit Photolithographic Patterns", Jul. 1, 1984, IBM, vol. 28 # 4, pp. 461-475.

Taylor, et al., "Enabling Energy Efficiency in Via-Patterned Gate Array Devices", Jun. 7-11, 2004, ACM Press, pp. 874-877.

Tian et al. "Model-Based Dummy Feature Placement for Oxide Chemical_Mechanical Polishing Manufacturability" 2000, ACM.

Tong, et al., "Regular Logic Fabrics for a Via Patterned Gate Array (VPGA), Custom Integrated Circuits Conference", Sep. 2003, Proceedings of the IEEE, pp. 53-56.

Vanleenhove, et al., "A Litho-Only Approach to Double Patterning", 2007, SPIE Proceeding Series, vol. 6520; 65202F.

Wang, et al., "Performance Optimization for Gridded-Layout Standard Cells", 2004, vol. 5567 SPIE.

Wang, J. et al., Standard Cell Layout with Regular Contact Placement, IEEE Trans. on Semicon. Mfg., vol. 17, No. 3, Aug. 2004.

Webb, Clair, "Layout Rule Trends and Affect upon CPU Design", 2006, vol. 6156 SPIE.

Webb, Clair, "45nm Design for Manufacturing," Intel Technology Journal, vol. 12, Issue 02, Jun. 17, 2008, ISSN 1535-864X, pp. 121-130.

Wenren, et al., "The Improvement of Photolithographic Fidelity of Two-dimensional Structures Though Double Exposure Method", 2007, SPIE Proceeding Series, vol. 6520; 65202I.

Wilcox, et al., "Design for Manufacturability: A Key to Semiconductor Manufacturing Excellence", 1998, IEEE, pp. 308-313.

Wu, et al., "A Study of Process Window Capabilities for Two-dimensional Structures under Double Exposure Condition", 2007, SPIE Proceeding Series, vol. 6520; 65202O.

Xiong, et al., "The Constrained Via Minimization Problem for PCB and VLSI Design", 1988, ACM Press/IEEE, pp. 573-578.

Yamamaoto, et al., "New Double Exposure Technique without Alternating Phase Shift Mask", 2007, SPIE Proceeding Series, vol. 6520; 652052P.

Yang, et al., "Interconnection Driven VLSI Module Placement Based on Quadratic Programming and Considering Congestion Using LFF Principles", 2004, IEEE, pp. 1243-1247.

Yao, et al., "Multilevel Routing With Redundant Via Insertion", Oct. 2006, IEEE, pp. 1148-1152.

Zheng, et al. "Modeling and Analysis of Regular Symmetrically Structured Power/Ground Distribution Networks", DAC, Jun. 10-14, 2002, ACM Press, pp. 395-398.

Zhu, et al., "A Stochastic Integral Equation Method for Modeling the Rough Surface Effect on Interconnect Capacitance", 2004, IEEE.

Zhu, et al., "A Study of Double Exposure Process Design with Balanced Performance Parameters for Line/Space Applications", 2007, SPIE Proceeding Series, vol. 6520; 65202H.

Zuchowski, et al., "A Hybrid ASIC and FPGA Architecture", 2003, IEEE, pp. 187-194.

Capodieci, L., et al., "Toward a Methodology for Manufacturability-Driven Design Rule Exploration," DAC 2004, Jun. 7-11, 2004, San Diego, CA.

Dictionary.com, "channel," in Collins English Dictionary—Complete & Unabridged 10th Edition. Source location: HarperCollins Publishers. http://dictionary.reference.com/browse/channel. Available: http://dictionary.reference.com.

Gupta et al. "Manufacturing-Aware Physical Design", 2003, ACM.

Gupta, Puneet, et al., "Manufacturing-aware Design Methodology for Assist Feature Correctness," 2005.

Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.

Halpin et al., "Detailed Placement with Net Length Constraints," Publication Year 2003, Proceedings of the 3rd IEEE International Workshop on System-on-Chip for Real-Time Applications, pp. 22-27.

Hur et al., "Mongrel: Hybrid Techniques for Standard Cell Placement," Publication Year 2000, IEEE/ACM International Conference on Computer Aided Design, ICCAD-2000, pp. 165-170.

Kuh et al., "Recent Advances in VLSI Layout," Publication Year 1990, Proceedings of the IEEE, vol. 78, Issue 2, pp. 237-263.

Liebmann et al., "Optimizing Style Options for Sub-Resolution Assist Features," Proc. of SPIE vol. 4346, 2001, pp. 141-152.

Mansfield et al., "Lithographic Comparison of Assist Feature Design Strategies," Proc. of SPIE vol. 4000, 2000, pp. 63-76.

Mishra, P., et al., "FinFET Circuit Design," Nanoelectronic Circuit Design, pp. 23-54, 2011.

Pham, D., et al., "FINFET Device Junction Formation Challenges," 2006 International Workshop on Junction Technology, pp. 73-77, Aug. 2006.

Shi et al., "Understanding the Forbidden Pitch and Assist Feature Placement," Proc. of SPIE vol. 4562, 2002, pp. 968-979.

Smayling et al., "APF Pitch Halving for 22 nm Logic Cells Using Gridded Design Rules," Proceedings of SPIE, USA, vol. 6925, Jan. 1, 2008, pp. 69251E-1-69251E-7.

Firedberg, et al., "Modeling Within-Field Gate Length Spatial Variation for Process-Design Co-Optimization," 2005 Proc. of SPIE vol. 5756, pp. 178-188.

Hakko, et al., "Extension of the 2D-TCC Technique to Optimize Mask Pattern Layouts," 2008 Proc. of SPIE vol. 7028, 11 pages.

Kawashima, et al., "Mask Optimization for Arbitrary Patterns with 2D-TCC Resolution Enhancement Technique," 2008 Proc. of SPIE vol. 6924, 12 pages.

Rosenbluth, et al., "Optimum Mask and Source Patterns to Print a Given Shape," 2001 Proc. of SPIE vol. 4346, pp. 486-502.

Socha, et al., "Simultaneous Source Mask Optimization (SMO)," 2005 Proc. of SPIE vol. 5853, pp. 180-193.

Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.

Yamazoe, et al., "Resolution Enhancement by Aerial Image Approximation with 2D-TCC," 2007 of SPIE vol. 6730, 12 pages.

Yu, et al., "True Process Variation Aware Optical Proximity Correction with Variational Lithography Modeling and Model Calibration," J. Micro/Nanolith. MEMS MOEMS, Jul.-Sep. 2007, vol. 6(3), 16 pages.

* cited by examiner

US 8,225,261 B2

METHODS FOR DEFINING CONTACT GRID IN DYNAMIC ARRAY ARCHITECTURE

CLAIM OF PRIORITY

This application claims priority under 35 U.S.C. 119(e) to U.S. Provisional Patent Application No. 61/034,927, filed Mar. 7, 2008, entitled "Defining and Using Contact Grids in Circuit Using Dynamic Array Architecture."

This application is a continuation-in-part application under 35 U.S.C. 120 of prior U.S. application Ser. No. 12/013,342, filed Jan. 11, 2008 now U.S. Pat. No. 7,917,879, entitled "Semiconductor Device with Dynamic Array Section," which claims priority under 35 U.S.C. 119(e) to both U.S. Provisional Patent Application No. 60/963,364, filed Aug. 2, 2007, and to prior U.S. Provisional Patent Application No. 60/972,394, filed Sep. 14, 2007.

This application is also a continuation-in-part application under 35 U.S.C. 120 of prior U.S. application Ser. No. 12/212,562, filed Sep. 17, 2008 now U.S. Pat. No. 7,842,975, entitled "Dynamic Array Architecture," which is a continuation application under 35 U.S.C. 120 of prior U.S. application Ser. No. 11/683,402, filed Mar. 7, 2007 now U.S. Pat. No. 7,446,352, which claims priority under 35 U.S.C. 119(e) to U.S. Provisional Patent Application No. 60/781,288, filed Mar. 9, 2006.

The disclosure of each above-identified patent application is incorporated herein by reference in its entirety.

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are approaching 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. The quality of the light interaction prediction is declining as process geometries shrink and as the light interactions become more complex.

In view of the foregoing, techniques are sought for managing lithographic gap issues as technology continues to progress toward smaller semiconductor device features sizes.

SUMMARY

In one embodiment, a method is disclosed for defining a vertical connection layout for a circuit. The method includes an operation for defining a first virtual grate as a set of parallel virtual lines extending across a layout area in a first direction. The virtual lines of the first virtual grate correspond to placement locations for layout features in a lower chip level. The method also includes an operation for defining a second virtual grate as a set of parallel virtual lines extending across the layout area in a second direction substantially perpendicular to the first direction. The virtual lines of the second virtual grate correspond to placement locations for layout features in a higher chip level. Each intersection point between virtual lines of the first and second virtual grates is a gridpoint within a vertical connection placement grid. The method further includes an operation for placing vertical connection structures at a number of gridpoints within the vertical connection placement grid so as to provide electrical connectivity between layout features in the lower and higher chip levels. The vertical connection structures are placed so as to minimize a number of different spacing sizes between neighboring vertical connection structures across the vertical connection placement grid.

In another embodiment, a method is disclosed for optimizing a cell layout. In the method, a first virtual grate is defined as a set of parallel virtual lines of uniform pitch extending across the cell layout in a first direction. Also, a second virtual grate is defined as a set of parallel virtual lines of uniform pitch extending across the cell layout in a second direction that is perpendicular to the first direction. Each intersection point between virtual lines of the first and second virtual grates is a gridpoint within a vertical connection placement grid. For either of the first virtual grate, the second virtual grate, or both the first and second virtual grates, each of a respective lower pitch limit, a respective upper pitch limit, and a respective pitch increment value is defined. A pitch range for a given virtual grate extends from the lower pitch limit of the given virtual grate to the higher pitch limit of the given virtual grate in increments of the pitch increment value of the given virtual grate. The method also includes defining a number of variants of the vertical connection placement grid. Each variant of the vertical connection placement grid corresponds to a different combination of first and second virtual grate pitch values within their respective pitch ranges. Multiple layouts of a cell are then generated, such that each of the multiple layouts of the cell is generated using a different variant of the vertical connection placement grid. An area efficiency metric and a manufacturability rating metric are calculated for each of the multiple layouts of the cell. Then, the area efficiency metric and manufacturability rating metric are evaluated for the multiple layouts of the cell to determine an optimum vertical connection placement grid. Then, the layout of the cell is implemented using the optimum vertical connection placement grid.

In another embodiment, a semiconductor chip is disclosed as including a cell defined to include a number of vertical connection structures placed in accordance with a vertical connection placement grid. The vertical connection placement grid is defined by a first virtual grate and a second virtual grate. The first virtual grate is defined by a set of parallel virtual lines extending across a layout of the cell in a first direction. The second virtual grate is defined by a set of parallel virtual lines extending across the layout of the cell in a second direction substantially perpendicular to the first direction. Each intersection point between virtual lines of the first and second virtual grates is a gridpoint within the vertical connection placement grid. The virtual lines of the first virtual grate correspond to potential placement locations for layout features in a particular chip level. The virtual lines of the second virtual grate correspond to potential placement locations for layout features in another chip level different than the particular chip level associated with the first virtual grate. Vertical connection structures are placed at a number of gridpoints within the vertical connection placement grid so as to provide electrical connectivity between layout features in the chip levels associated with the first and second virtual grates. Also, the vertical connection structures are placed so as to minimize a number of different spacing sizes between neighboring vertical connection structures across the layout of the cell and so as to minimize a layout area of the cell.

Other aspects and advantages of the invention will become more apparent from the following detailed description, taken in conjunction with the accompanying drawings, illustrating by way of example the present invention.

DETAILED DESCRIPTION

Figure 1:
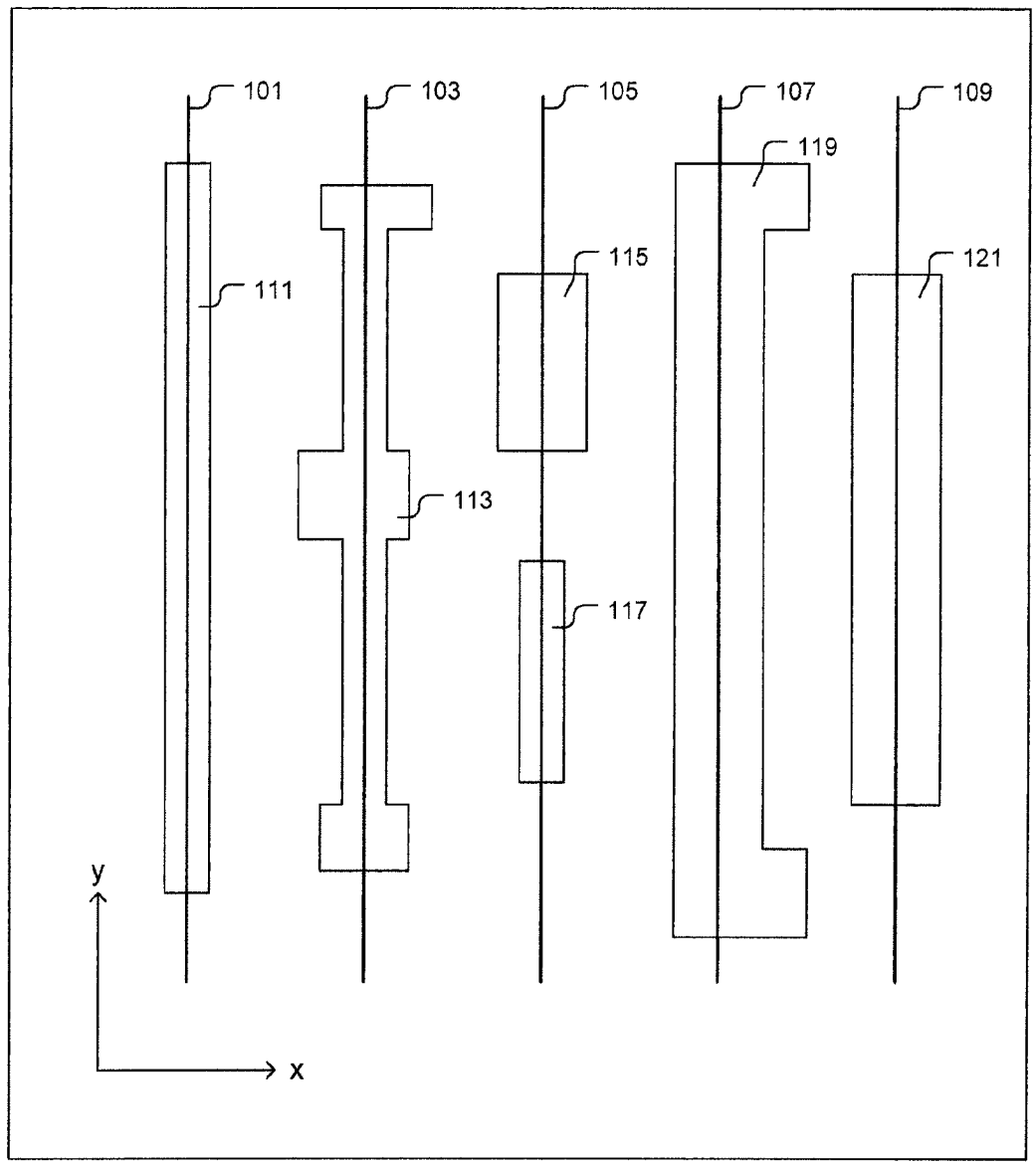
FIG. 1 shows an exemplary chip level layout based on the dynamic array architecture, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

In deep sub-micron VLSI (Very-Large-Scale Integration) design, process compensation techniques (PCTs) such as Optical Proximity Correction (OPC) or sub-resolution feature utilization, among others, enhance the printing of layout features. PCTs are easier to develop and implement when the layout is highly regular and when the quantity and diversity of lithographic interactions are minimized across the layout.

Dynamic Array Architecture

The dynamic array architecture represents a semiconductor device design paradigm in which linear-shaped layout features are defined along a regular-spaced virtual grate (or regular-spaced virtual grid) in a number of levels of a cell, i.e., in a number of levels of a semiconductor chip. The virtual grate is defined by a set of equally spaced, parallel virtual lines extending across a given level in a given chip area. The virtual grid is defined by a first set of equally spaced, parallel virtual lines extending across a given level in a given chip area in a first direction, and by a second set of equally spaced, parallel virtual lines extending across the given level in the given chip area in a second direction, where the second direction is perpendicular to the first direction. In various embodiments, the virtual grate of a given level can be oriented either substantially perpendicular of substantially parallel to the virtual grate of an adjacent level.

A linear layout feature is defined as a layout shape that extends along a virtual line of a virtual grate without contacting a neighboring linear layout feature that extends along a different virtual line of the virtual grate. In one embodiment, a linear layout feature can be defined to have a substantially rectangular cross-section when viewed in an as-drawn state. In another embodiment, a linear layout feature can be defined to have a primarily rectangular cross-section defined by a width and length, with some allowable variation in width along its length. It should be understood, however, that in this embodiment, the linear layout feature of varying width may not contact a neighboring linear layout feature that extends along a different virtual line of the same virtual grate within the same chip level. For example, some linear layout features may have one or more variations in width at any number of locations along their length, wherein "width" is defined across the substrate in a direction perpendicular to the virtual line along which the linear layout feature is disposed. Such a variation in width may be used to define a contact head upon which a contact is to connect, or may serve some other purpose. Additionally, different linear layout features within a given chip level can be defined to have the same width or different widths, so long as the width variation is predictable from a manufacturing perspective and does not adversely impact the manufacture of the linear layout feature or its neighboring layout features.

In the dynamic array architecture, variations in a vertical cross-section shape of an as-fabricated linear layout feature can be tolerated to an extent, so long as the variation in the vertical cross-section shape is predictable from a manufacturing perspective and does not adversely impact the manufacture of the given linear layout feature or its neighboring layout features. In this regard, the vertical cross-section shape corresponds to a cut of the as-fabricated linear layout feature in a plane perpendicular to the centerline of the linear layout feature.

FIG. 1 shows an exemplary chip level layout based on the dynamic array architecture, in accordance with one embodiment of the present invention. A number of virtual lines 101, 103, 105, 107, 109 are each defined to extend across the substrate, i.e., across the chip level layout of the portion of the chip, in a single common direction (y direction). Each of linear layout features 111, 113, 115, 117, 119, 121 is defined to extend along a single virtual line (101, 103, 105, 105, 107, 109, respectively), without contacting a neighboring linear layout feature that extends along a different virtual grate line. Some linear layout features, such as 111, 115, 117, 121, are defined to have a substantially rectangular cross-section when viewed in their as-drawn state. Whereas other linear layout features, such as 113 and 119, are defined to have some variation in width (in x direction) along their length (in y direction). It should be appreciated that although linear layout features 113 and 119 vary in width along their length, neither of linear layout features 113 and 119 contacts a neighboring linear layout feature that extends along a different virtual grate line.

In one embodiment, each linear layout feature of a given chip level is substantially centered upon one of the virtual lines of the virtual grate associated with the given chip level. A linear layout feature is considered to be substantially centered upon a particular virtual grate line when a deviation in alignment between of the centerline of the linear layout feature and the particular virtual grate line is sufficiently small so as to not reduce a manufacturing process window from what would be achievable with a true alignment between of the centerline of the linear layout feature and the virtual grate line. In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature.

In another embodiment, some linear layout features in a given chip level may not be centered upon a virtual grate line. However, in this embodiment, the linear layout features remain parallel to the virtual lines of the virtual grate, and hence parallel to the other linear layout features in the given chip level. Therefore, it should be understood that the various linear layout features defined in a layout of a given chip level are oriented to extend across the given chip level in a parallel manner.

In one embodiment, within a given chip level defined according to the dynamic array architecture, proximate ends of adjacent, co-aligned linear layout features may be separated from each other by a substantially uniform gap. More specifically, adjacent ends of linear layout features defined along a common virtual grate line are separated by an end gap, and such end gaps within the chip level associated with the virtual grate may be defined to span a substantially uniform distance. Additionally, in one embodiment, a size of the end gaps is minimized within a manufacturing process capability so as to optimize filling of a given chip level with linear layout features.

Also, in the dynamic array architecture, a portion of a chip level can be defined to have any number of virtual grate lines occupied by any number of linear layout features. In one example, a portion of a given chip level can be defined such that all lines of its virtual grate are occupied by at least one linear layout feature. In another example, a portion of a given chip level can be defined such that some lines of its virtual grate are occupied by at least one linear layout feature, and other lines of its virtual grate are vacant, i.e., not occupied by any linear layout features. Furthermore, in a portion of a given chip level, any number of successively adjacent virtual grate lines can be left vacant. Also, the occupancy versus vacancy of virtual grate lines by linear layout features in a portion of a given chip level may be defined according to a pattern or repeating pattern across the given chip level.

In a given chip level, some of the linear layout features may form functional structures within an integrated circuit, and other linear layout features may be non-functional with respect to integrated circuit operation. It should be understood that the each of the linear layout features, regardless of function, is defined to extend across the chip level in the common direction of the virtual grate and to be devoid of a substantial change in direction along its length. It should be understood that each of the linear layout features, regardless of function, is defined such that no linear layout feature along a given virtual grate line is configured to connect directly within the same chip level to another linear layout feature defined along a different virtual grate line.

Additionally, within the dynamic array architecture, vias and contacts are defined to interconnect a number of layout features in various levels so as to form a number of functional electronic devices, e.g., transistors, and electronic circuits. Layout features for the vias and contacts can be aligned to a virtual grid. In one embodiment, a virtual grid is defined as a combination of virtual grates associated with a plurality of levels to which the vias and contacts will connect. Also, in one embodiment, a combination of virtual grates used to define a virtual grid can include one or more virtual grates defined independent from a particular chip level.

In the dynamic array architecture, a number of layout features in various chip levels form functional components of an electronic circuit. Additionally, some of layout features within various chip levels may be non-functional with respect to an electronic circuit, but are manufactured nonetheless so as to reinforce manufacturing of neighboring layout features. It should be understood that the dynamic array architecture is defined to enable accurate prediction of semiconductor device manufacturability with a high probability.

In view of the foregoing, it should be understood that the dynamic array architecture is defined by placement of linear layout features on a regular-spaced grate (or regular-spaced grid) in a number of levels of a cell, such that the linear layout features in a given level of the cell are oriented to be substantially parallel with each other in their traversal direction across the cell. As discussed above, in the dynamic array architecture, each as-drawn linear layout feature, i.e., prior to PCT processing, is defined to be devoid of a substantial change in direction relative to its traversal direction across the cell.

Cell

A cell, as referenced herein, represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC, RET, etc. It should also be understood that each cell description includes the layouts for the cell in each level of a chip, as required to implement the logic function of the cell. More specifically, a cell description includes layouts for the cell in each level of the chip extending from the substrate level up through a particular interconnect level.

Exemplary Embodiments

Figure 2:
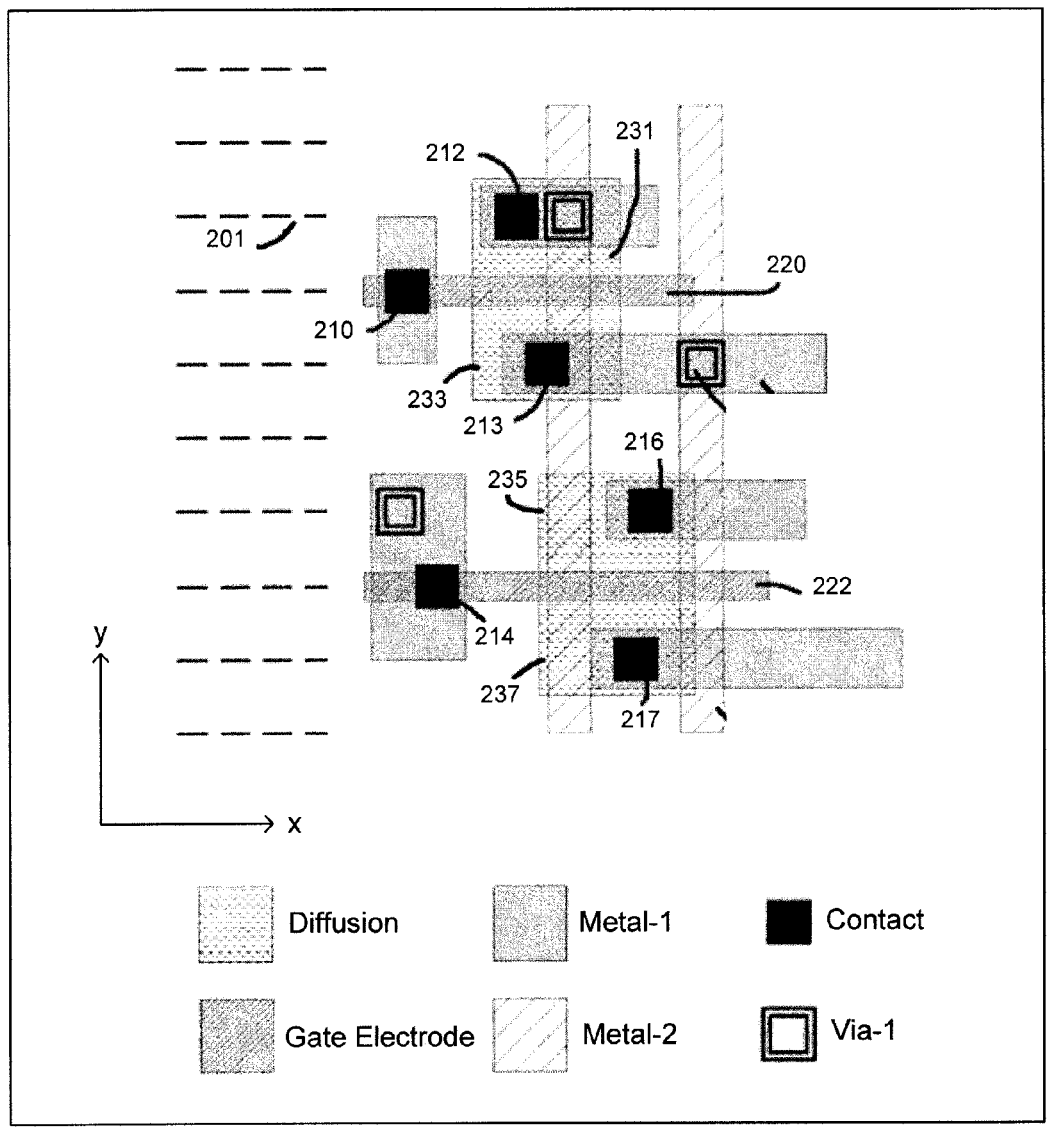
FIG. 2 shows an exemplary layout defined according to the dynamic array architecture, in accordance with one embodiment of the present invention.

One method of constructing a circuit, such as a memory circuit, is to use the dynamic array architecture with a virtual grate having virtual lines that extend in a common direction across a portion of chip layout. The portion of the chip layout may correspond to a cell placed on the chip or to essentially any type of circuit block placed on the chip. For purposes of description, virtual lines of a given virtual grate are considered to extend in either an X-axis or a Y-axis direction across the portion of the chip. For example, FIG. 2 shows virtual grate lines 201 extending in the X-axis direction. In this example, the virtual grate lines 201 are used to define positions of gate-electrode wires (gates) and allowable diffusion contact locations. In various embodiments, a first level of interconnect wires (i.e., metal-1 wires) can be defined to run either parallel to the gates or perpendicular to the gates. Also, in one embodiment, a second level of interconnect wires (i.e., metal-2 wires) can be defined to run either parallel to the gates or perpendicular to the gates.

A number of contact features (contacts) can defined to extend in a substantially vertical manner through the chip so as to electrically connect gates to metal-1 wires (or other interconnect level wires), and to connect diffusion areas to metal-1 wires (or to other interconnect level wires). Additionally, a number of via features (e.g., via-1) can be defined to extend in a substantially vertical manner through the chip so as to electrically connect metal-1 wires to metal-2 wires, or to connect wires in any two interconnect levels. Thus, from a cross-sectional point of view, contacts and vias represent particular types of vertical connection structures that extend vertically between or through a number of different chip levels.

FIG. 2 shows an exemplary layout defined according to the dynamic array architecture, in accordance with one embodiment of the present invention. In FIG. 2, the virtual grate lines 201 are oriented to extend in the X-axis direction. The virtual grate lines 201 are used to define the placement of contacts 210, 212, 213, 214, 216, and 217, relative to the Y-axis direction. Also, the virtual grate lines 201 are used to define the placement of gates 220 and 222, relative to the Y-axis direction. The example of FIG. 2 does not use a virtual grate oriented in the Y-axis direction. Therefore, no virtual grate restriction is provided for contact placement relative to the X-axis direction. For instance, contacts 210, 212, 213, 214, 216, and 217 can be freely placed along gates 220 and 222, or along diffusion areas 231, 233, 235, and 237, so as to make connections to the sources and drains of transistors. In one embodiment, the contacts are placed to comply with the design rules of the specific process technology.

Exemplary embodiments are also disclosed herein for defining and utilizing perpendicularly oriented virtual grates to define a contact grid for a circuit layout, in accordance with the dynamic array architecture. Also, exemplary embodiments are disclosed herein for defining and evaluating acceptability criteria for a given circuit layout that is defined using the contact grid, in accordance with the dynamic array architecture. As discussed below, the acceptability criteria for a given circuit layout may be defined by metrics such as Area Efficiency and Manufacturability Ratings. Also, it should be understood that although the embodiments disclosed herein can be applied to essentially any type of circuitry layout, the disclosed embodiments are particularly applicable to a memory circuit layout.

For discussion purposes, a Y-axis virtual grate is defined by a set of equally spaced virtual lines that extend across the chip area in the X-axis direction, thereby indexing the contact grid in the Y-axis direction. Similarly, an X-axis virtual grate is defined by a set of equally spaced virtual lines that extend across the chip area in the Y-axis direction, thereby indexing the contact grid in the X-axis direction. The Y-axis virtual grate and X-axis virtual grate are perpendicular to each other, and combine to form the contact grid.

In the dynamic array architecture, transistor placement can be considered optimum because there are limited constraints beyond the dynamic array architecture layout rules and design issues such as signal routing. Use of the X-axis virtual grate serves to constrain transistor placement in the X-axis direction. This X-axis virtual grate constraint may increase the cell layout area, or reduce the area utilization efficiency for a specific section of the cell layout. Either the total cell layout area, the sectional cell layout area utilization efficiency, or both, may be used as Area Efficiency metrics for the above-mentioned circuit layout acceptability criteria.

Figure 3:
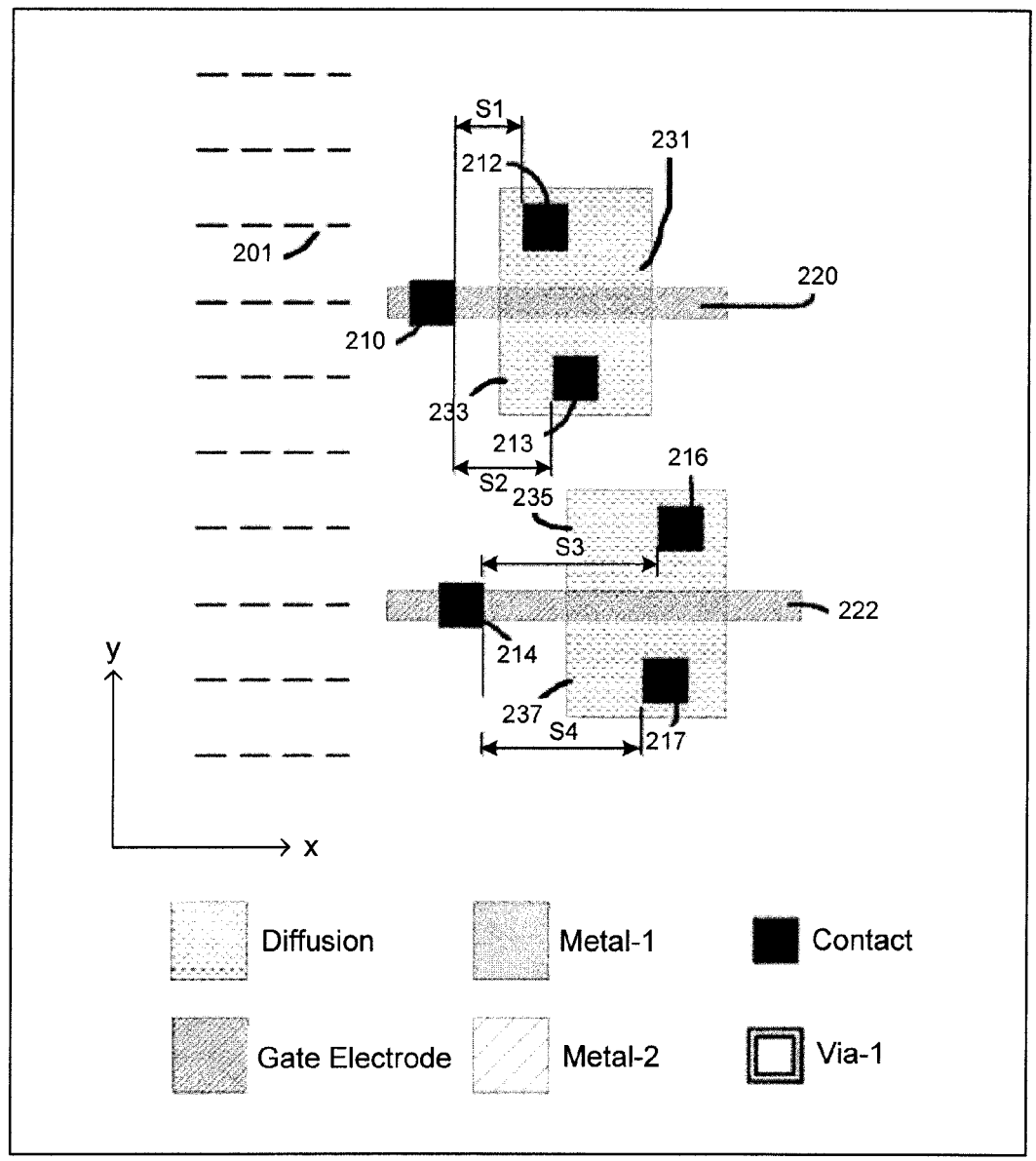
FIG. 3 shows the same layout as FIG. 2, with the metal-1, metal-2, and via-1 features omitted for clarity of illustration.

Another criterion to consider is the Manufacturability Rating of the cell. There are multiple metrics that may be used to rate a cell layout's manufacturability. One metric that may be applicable is the quantity of edge-to-edge interactions between contacts in a specific layout. FIG. 3 shows the same layout as FIG. 2, with the metal-1, metal-2, and via-1 features omitted for clarity of illustration. As shown in FIG. 3, contact spacing can be measured in the X-axis direction. For example, contact spacing S1 is measured between contact pair 210 and 212. Contact spacing S2 is measured between contact pair 210 and 213. Contact spacing S3 is measured between contact pair 214 and 216. Contact spacing S4 is measured between contact pair 214 and 217. Because the contact spacings S1, S2, S3, and S4 are different, the quantity of edge-to-edge interactions between contacts is increased, thereby lowering the Manufacturing Rating of the layout because the process compensation techniques (PCTs) require greater complexity. Additionally, other metrics that may be applicable are edge-to-edge interactions between diffusion areas, or edge spacings between metal-1 wires, or similar interactions between other layout features. Moreover, it should be understood that the Manufacturability Rating of the layout can be based on other metrics not specifically listed above.

Balancing the Area Efficiency metric (i.e., cell layout area utilization efficiency) against the Manufacturing Rating metric is a consideration in selecting a pitch value for a virtual grate. The pitch value for a given virtual grate corresponds to the perpendicular distance between adjacent virtual grate lines in the given virtual grate. The cell designer may set a target for each of the Area Efficiency and Manufacturing Rating metrics over the entire design to guide the overall implementation. Thus, different cells may have a different balance of performance with regard to the Area Efficiency and Manufacturing Rating metrics in order to achieve an overall design target with regard to Area Efficiency and Manufacturing Rating.

Figure 4:
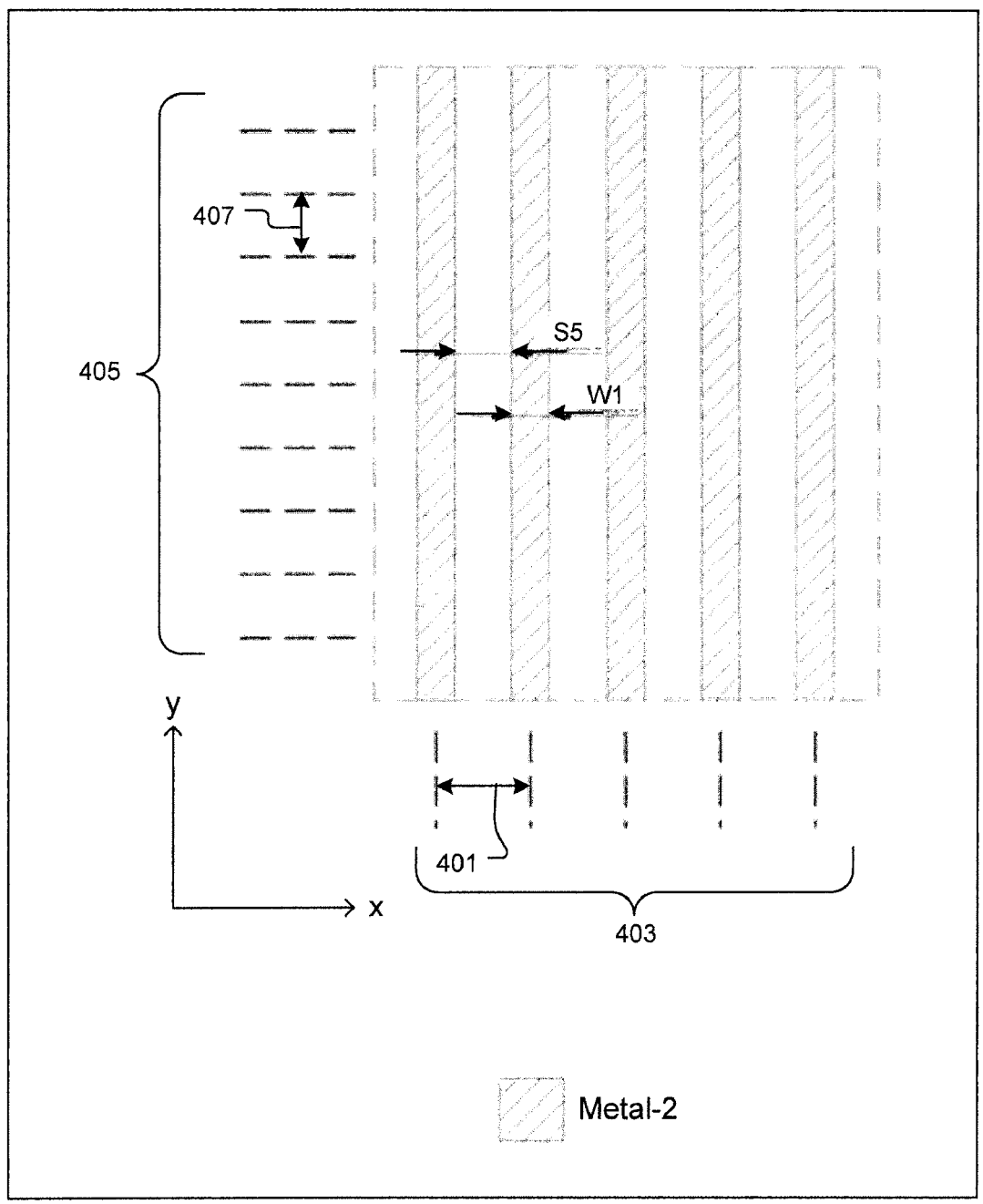
FIG. 4 shows an example of a logic cell whose metal-2 wires are defined at a minimum spacing, in accordance with one embodiment of the present invention.

In one embodiment, the X-Axis virtual grate of the contact grid is defined to follow the linear-shaped metal-2 wires running over the cell. As an example, a cell may use a minimum metal-2 wire pitch to obtain maximum signal density. FIG. 4 shows an example of a logic cell whose metal-2 wires are defined at minimum spacing S5. In the present embodiment, an X-axis virtual grate is defined by a set of parallel virtual grate lines 403 respectively centered on each metal-2 wire, such that a pitch 401 of the X-axis virtual grate is equal to a sum of the metal-2 wire spacing S5 and the metal-2 wire width W1. FIG. 4 also shows a Y-axis virtual grate defined by a set of parallel virtual grate lines 405 spaced at a uniform pitch 407. The X-axis and Y-axis virtual grates extend perpendicularly to each other and combine to form a virtual grid for contact placement. In laying out a cell using the contact grid defined by the Y-axis virtual grate and X-axis virtual grate, contacts are placed only at contact grid points, and transistors and wiring are laid out to conform to dynamic array architecture constraints.

Figure 5:
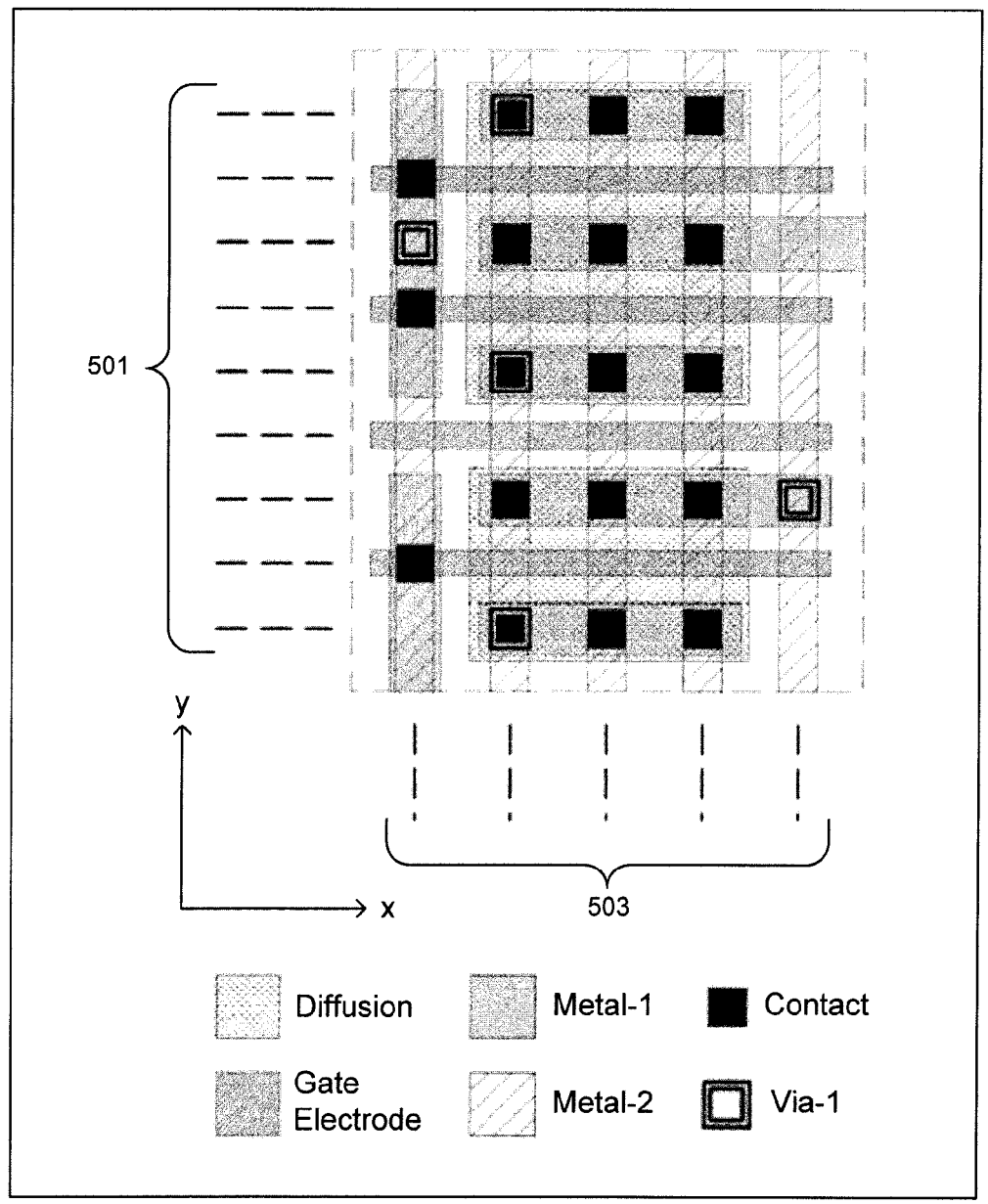
FIG. 5 shows an exemplary logic cell with transistors, contacts, and routing wires placed so as to align with a Y-axis virtual grate and/or an X-axis virtual grate, in accordance with one embodiment of the present invention.

FIG. 5 shows an exemplary logic cell with transistors, contacts, and routing wires placed so as to align with a Y-axis virtual grate 501 and/or an X-axis virtual grate 503. More specifically, the transistors of FIG. 5 are defined by diffusion regions and gate electrodes (gates) laid out to align with and extend along virtual lines of the Y-axis virtual grate 501. Also, the metal-2 routing wires are laid out to align with and extend along virtual lines of the X-axis virtual grate 503. It should be appreciated that in the example of FIG. 5, the contact-to-contact spacings are regular and consistent, thereby lowering the quantity of different edge-to-edge lithographic interactions in the layout, and thereby increasing the Manufacturing Rating metric of the cell. Other types of cells may be constructed using the same method as used to construct the example cell of FIG. 5.

Figure 6:
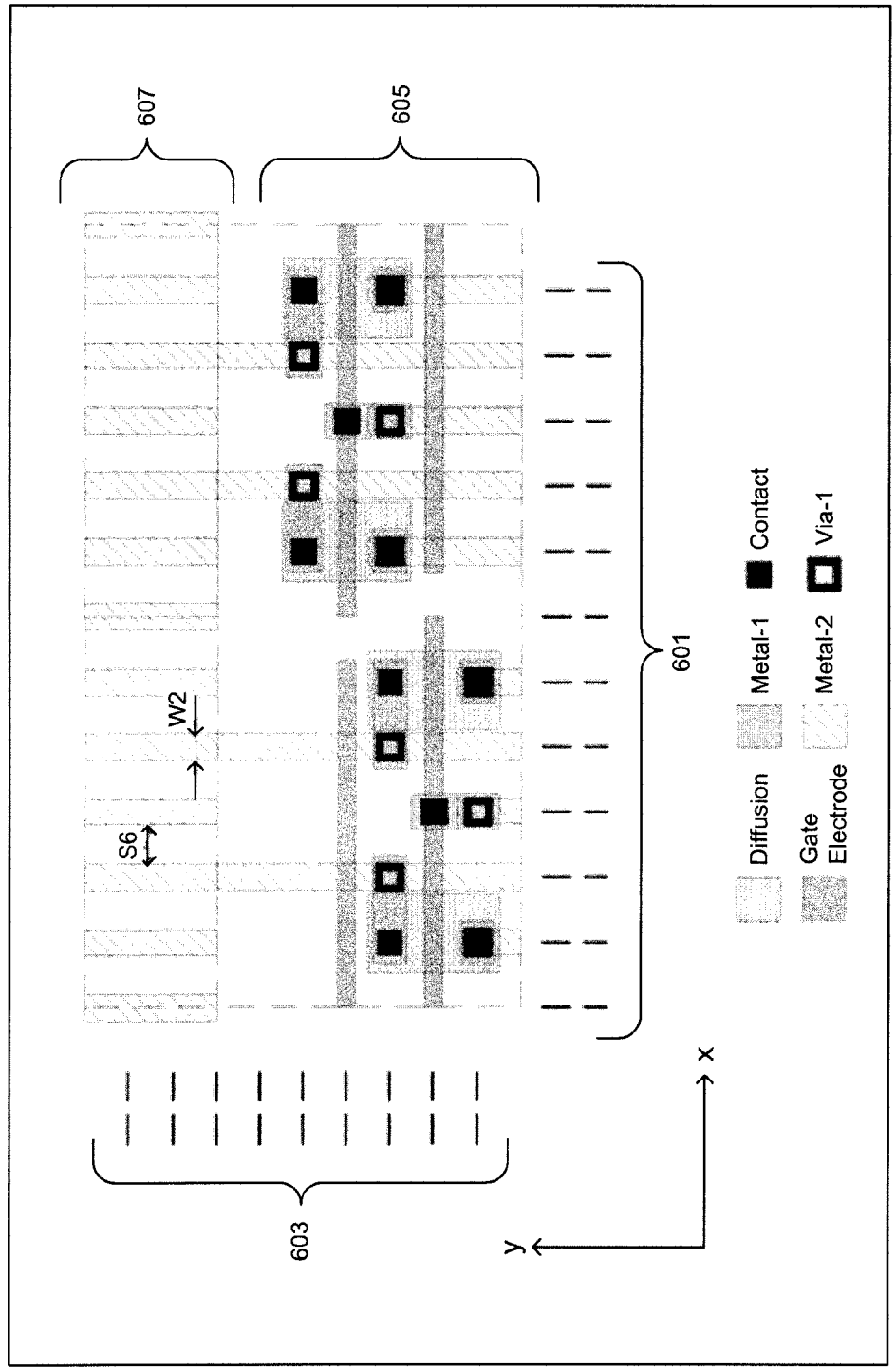
FIG. 6 shows a cell layout having metal-2 wires defined by a bitcell array to which the cell interfaces, in accordance with one embodiment of the present invention.

FIG. 6 shows a cell layout 605 having metal-2 wires defined by a bitcell array 607 to which the cell interfaces. Because the metal-2 wires are defined by the bitcell array 607, the metal-2 wire width W2 might not be of minimum size for the cell layout 605, and the metal-2 wire spacing S6 may not be of minimum size for the cell layout 605. Because the cell layout 605 follows the bitcell array's 607 metal-2 wires, an X-axis virtual grate 601 for the cell layout 605 is defined by the bitcell array's 607 metal-2 wires. The gate features and diffusion areas of the transistors within the cell layout 605 are placed to allow for contact placement on a contact grid defined by the X-axis virtual grate 601 and a Y-axis virtual grate 603.

It can be observed that the manufacturing rating of the cell layout 605 is consistent with the example cell of FIG. 5, but the sectional cell layout Area Efficiency metric of cell layout 605 could be less than desired due to the metal-2 wire association with the bitcell array 607. Thus, the transistor placements in the cell layout 605 may not be optimum. If the target Area Efficiency and Manufacturability Rating metrics are not satisfied with the implementation of cell layout 605, the designer might use a different X-axis virtual grate 601 pitch.

Figure 7:
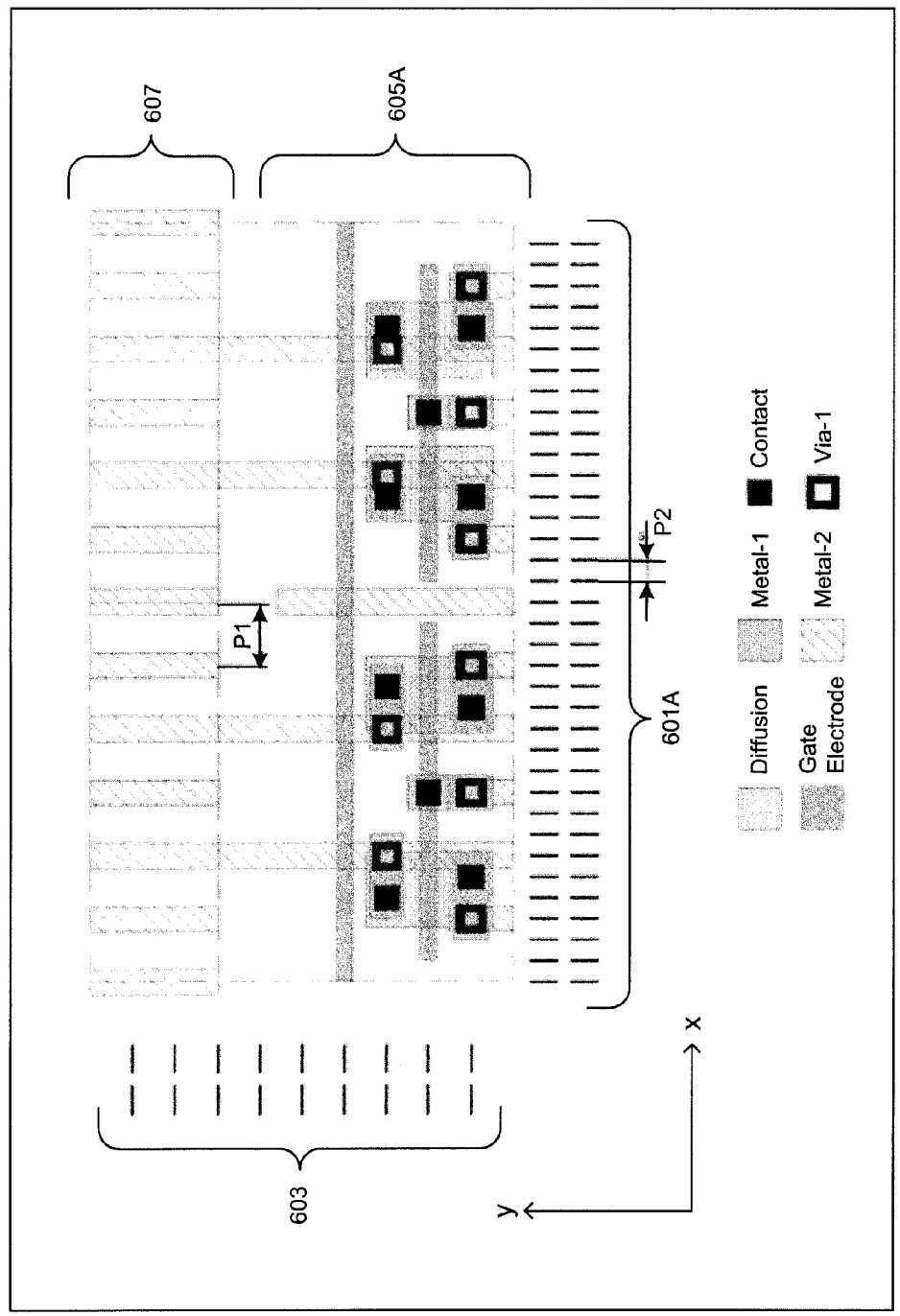
FIG. 7 shows a cell layout that is an alternate implementation of the cell layout of FIG. 6, in accordance with one embodiment of the present invention.

FIG. 7 shows a cell layout 605A that is an alternate implementation of the cell layout 605 of FIG. 6, in accordance with one embodiment of the present invention. The cell layout 605A uses an X-axis virtual grate 601A having a pitch P2 that is less than the metal-2 wire pitch P1, so as to enable finer balancing of the Area Efficiency metric versus the Manufacturing Rating metric of the cell. Specifically, use of a finer virtual grate, i.e., smaller pitch, or less restrictive virtual grid may increase area efficiency. Selection of the finer, i.e., smaller, pitch P2 for the X-axis virtual grate 601A may consider factors such as process design rules, specific sizes of the transistors involved, an amount of signal routing in the cell, among other factors. Once the X-axis virtual grate pitch P2 is set, the cell layout 601A is completed by following prescribed contact placement rules and layout rules.

To search for an optimum or an acceptable virtual grate pitch, a pitch search range can be defined by a lower pitch limit and an upper pitch limit. In one embodiment, the lower pitch limit of the virtual grate can be defined in terms of the manufacturing process features/capabilities and mask generation capabilities. For example, in an advanced ultra-deep submicron process technology, an as-drawn gate length dimension may be referenced as the smallest feature size manufacturable by the process and/or mask generation capabilities. Another factor that may affect the lower pitch limit is the mask resolution. Because process compensation techniques (PCTs) may be dependent on the gate length dimension and/or mask resolution, the lower pitch limit of the virtual grate may be defined as a mathematical common factor or a mathematical common multiple of both the gate length and the mask resolution.

The upper pitch limit of the search range may be a mathematical factor or a mathematical multiple of the wire pitch of any interconnect layer whose features are commonly oriented (i.e., parallel) with the virtual grate. In one embodiment, the optimum pitch search for the virtual grate is conducted by linearly incrementing the virtual grate pitch through the pitch search range. The increment size used for the virtual grate optimum pitch search can be set in a number of ways, including but not limited to, using a mathematical multiple of the mask resolution. At each incremented pitch value within the search range, the cell layout is re-implemented using the contact grid defined in-part by the adjusted virtual grate. Then, the corresponding Area Efficiency and Manufacturability Rating metrics for the re-implemented cell layout are determined and recorded. The Area Efficiency and Manufacturability Rating metrics at each pitch value can be compared to corresponding targets to determine which virtual grate pitch value provides best overall balance among the metrics and satisfies any specified acceptance criteria, if applicable.

It should be further understood, that a virtual grid defined by two perpendicularly oriented virtual grates can be optimized by searching through virtual grate pitch adjustment ranges of either or both of the virtual grates that define the virtual grid. For example, if a virtual grid for gate contact placement is defined by a gate level virtual grate and an interconnect level virtual grate, optimization of the virtual grid for contact placement can be done by either of the following: 1) adjusting the virtual grate pitch of the gate level only, 2) adjusting the virtual grate pitch of the interconnect level only, or 3) adjusting the virtual grate pitches of both the gate level and interconnect level. Each different combination of virtual grate pitches for the gate level and interconnect level represents a different variant of the virtual grid to be evaluated for contact placement.

Figure 8:
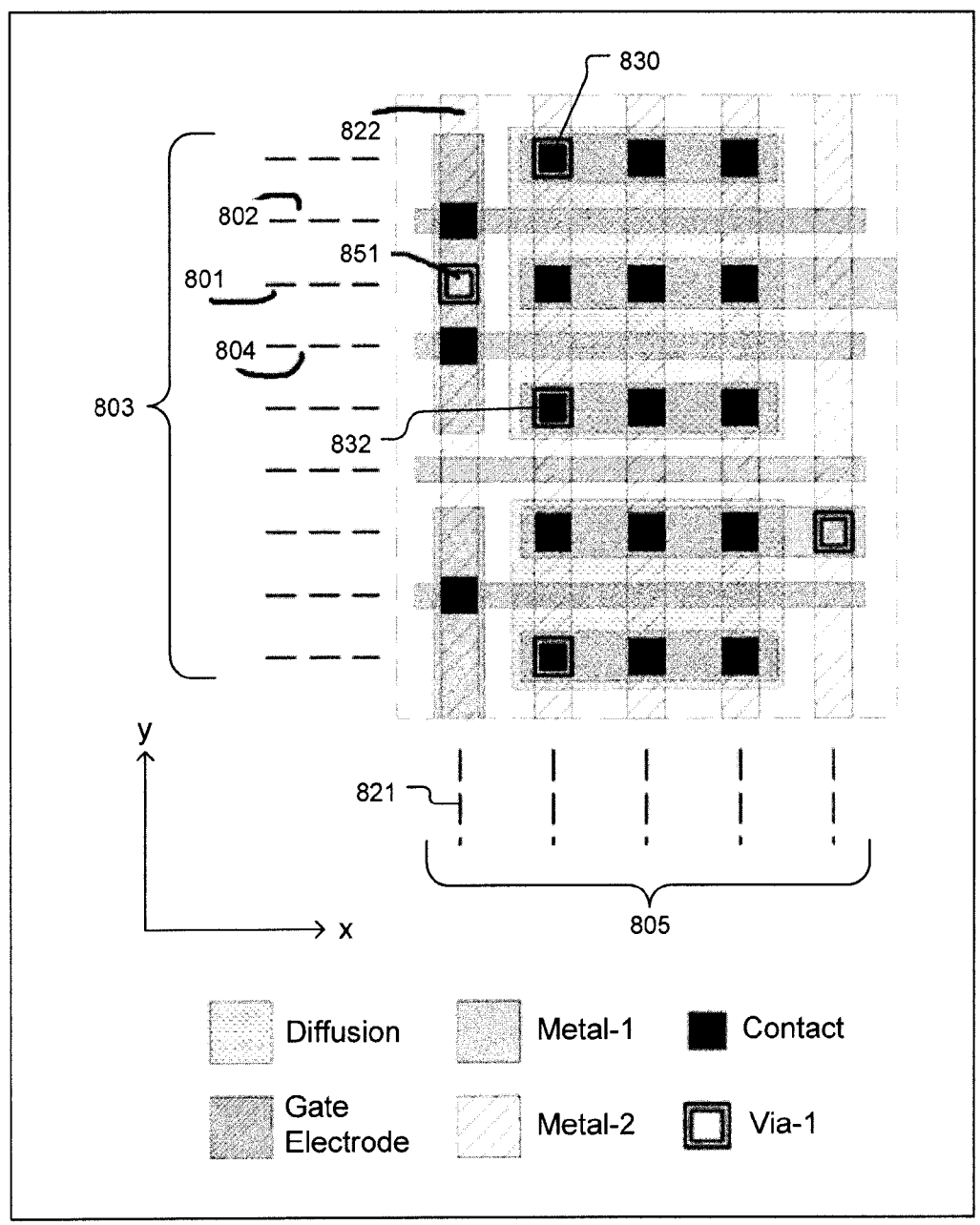
FIG. 8 shows an exemplary cell implementation in which vias are placed on diffusion contact gridlines corresponding to Y-axis virtual grate lines, in accordance with one embodiment of the present invention.

It should be appreciated that the above-described techniques for placing contacts can also be applied to the placement of vias, and any other type of vertical connection structure. For example, FIG. 8 shows an exemplary cell implementation in which vias are placed on diffusion contact gridlines corresponding to Y-axis virtual grate lines, in accordance with one embodiment of the present invention. In FIG. 8, via 851 is placed on a virtual grid point defined by the diffusion virtual grate line 801 of the Y-axis virtual grate 803 and the metal-2 wire virtual grate line 821 of the X-axis virtual grate line 805. In the example of FIG. 8, a quantity of different via edge-to-edge spacings may be used as a Manufacturability Rating metric for the layout. For example, the via 851 is not placed along either of gate virtual grate lines 802 or 804 even though the resulting layout may be DRC (design rule checking) correct. Rather, the via 851 is placed between the vias 830 and 832 to minimize a number of different via edge-to-edge spacings within the layout, and thereby increase the Manufacturability Rating of the layout. It should be understood that other Manufacturability Rating metrics may be used in various combinations. Possible Manufacturability Rating metrics can include, but are not limited to, a quantity of different metal-2 edge-to-edge spacings in the layout, a quantity of different metal-1 edge-to-edge spacings in the layout, or other similar layout feature interactions.

In one embodiment, a vertical connection structure (i.e., contact or via) grid is defined by two orthogonally related virtual grates, wherein one or both of these virtual grates are not utilized for placement of layout shapes within a given chip level. For example, in one exemplary embodiment, vertical connection structures are to be defined between two chip levels, wherein the layout features in each chip level are oriented in the same direction, i.e., run parallel to each other.

In this embodiment, one of the virtual grates used to define the virtual connection structure grid may correspond to a virtual grate used to place layout shapes in one of the two chip levels. However, the second virtual grate used to define the virtual connection structure grid can be defined arbitrarily and may not be used for placement of layout shapes within a particular chip level. Therefore, the second virtual grate is defined to restrict placement of vertical connection structures along the length of the layout shapes in the two commonly oriented chip levels. Hence, the second virtual grate can be defined to limit a number of vertical connection spacing options along the direction of extent of the layout shapes in the two commonly oriented chip levels. It should be further understood that in another embodiment both of the virtual grates used to define a vertical connection structure grid may be defined arbitrarily and may not specifically correspond to placement of layout shapes in any chip level.

Figure 9:
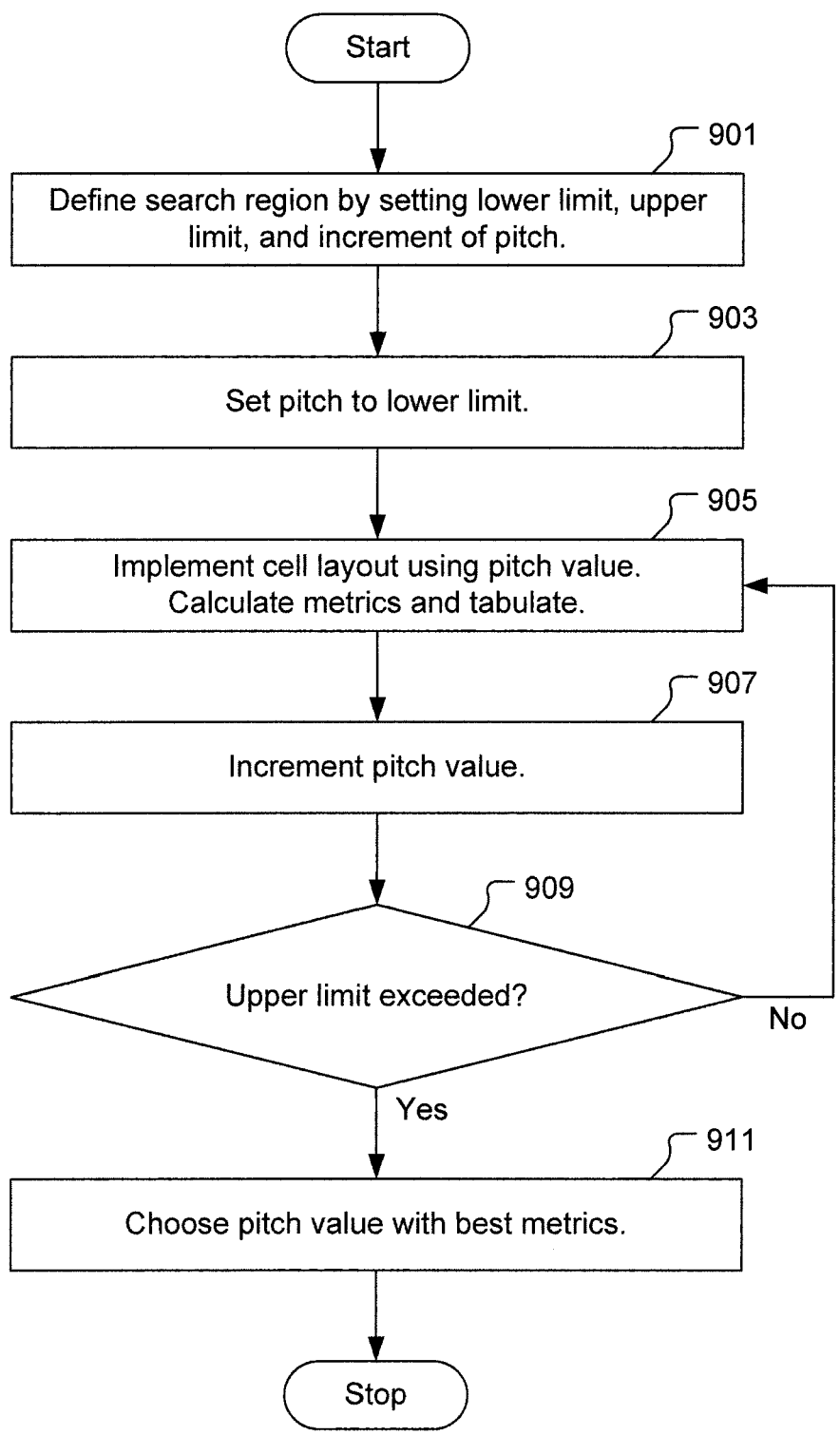
FIG. 9 is an illustration showing a flowchart of method for determining an optimum virtual grate pitch value, in accordance with one embodiment of the present invention.

FIG. 9 is an illustration showing a flowchart of method for determining an optimum virtual grate pitch value, in accordance with one embodiment of the present invention. An operation 901 is performed to define the pitch search parameters by determining the lower pitch limit and upper pitch limit for the virtual grate, and by determining the virtual grate pitch increment value for the linear search. An operation 903 is performed to set the virtual grate pitch value to the lower limit. Then, an operation 905 is performed to implement the cell using the set pitch value. Operation 905 also includes calculating the acceptability criteria metrics (such as the Area Efficiency and Manufacturability metrics) for the cell. The calculated acceptability criteria metrics are tabulated according to the corresponding X-axis virtual grate pitch value. An operation 907 is then performed to increment the X-axis virtual grate pitch value by the pitch increment value defined in operation 901. A decision operation 909 is performed to determine if the X-axis virtual grate pitch value calculated in operation 907 exceeds the pitch upper limit defined in operation 901. If operation 909 determines that the pitch upper limit value is not exceeded, the method reverts back to operation 905 and continues. If operation 909 determines that the pitch upper limit is exceeded, the method proceeds with an operation 911 in which the tabulated acceptability criteria metrics are compared and an optimum X-axis virtual grate pitch value is selected for use in the cell layout.

Figure 10:
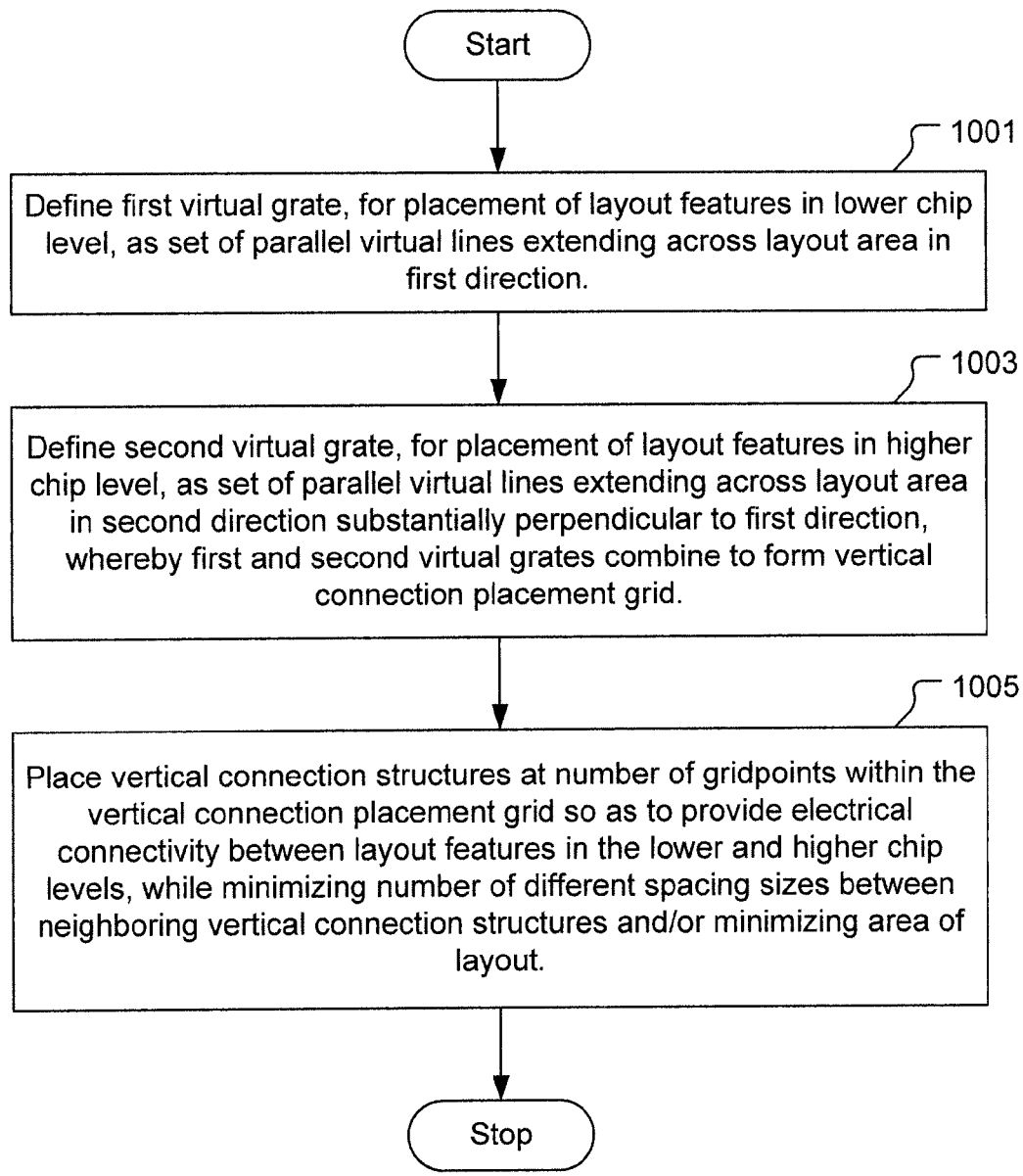
FIG. 10 shows a flowchart of a method for defining a vertical connection layout for a circuit, in accordance with one embodiment of the present invention.

FIG. 10 shows a flowchart of a method for defining a vertical connection layout for a circuit, in accordance with one embodiment of the present invention. The method includes an operation 1001 for defining a first virtual grate as a set of parallel virtual lines extending across a layout area in a first direction. The method also includes an operation 1003 for defining a second virtual grate as a set of parallel virtual lines extending across the layout area in a second direction substantially perpendicular to the first direction. Each intersection point between virtual lines of the first and second virtual grates is a gridpoint within a vertical connection placement grid. In one embodiment, the virtual lines of the first virtual grate correspond to potential placement locations for layout features in a lower chip level, and the virtual lines of the second virtual grate correspond to potential placement location for layout features in a higher chip level. In another embodiment, the virtual lines of the first virtual grate correspond to potential placement locations for layout features in a higher chip level, and the virtual lines of the second virtual grate correspond to potential placement location for layout features in a lower chip level.

The method further includes an operation 1005 for placing vertical connection structures at a number of gridpoints within the vertical connection placement grid so as to provide electrical connectivity between layout features in the lower and higher chip levels. In one embodiment, the vertical connection structures are placed so as to minimize a number of different spacing sizes between neighboring vertical connection structures across the vertical connection placement grid. In another embodiment, the vertical connection structures are placed so as to minimize an area of the layout. Additionally, in one embodiment, the vertical connection structures are placed so as to optimally balance a reduction in both an area of the layout and a number of different spacings between neighboring vertical connection structures within the layout.

In one embodiment, layout features placed in accordance with either the first or second virtual grate are linear-shaped gate electrode features. In this embodiment, the vertical connection structures are defined as gate electrode contacts. Also, in one instance of this embodiment, a pitch of the virtual grate used for gate electrode placement is equal to one-half of a center-to-center perpendicular spacing between adjacently placed linear-shaped gate electrode features. In another embodiment, the vertical connection structures are defined as diffusion contacts. In yet another embodiment, both the first and second virtual grates correspond to respective interconnect levels. In this embodiment, the vertical connection structures are defined as via structures.

In one embodiment, the method of FIG. 10 can further include an operation for systematically adjusting either a pitch of the first virtual grate, a pitch of the second virtual grate, or pitches of both the first and second virtual grates to generate a revised vertical connection placement grid. Also in this embodiment, an operation is performed to revise placement of the vertical connection structures according to the revised vertical connection placement grid. Then, an operation is performed to determining whether the number of different spacing sizes between neighboring vertical connection structures across the revised vertical connection placement grid is reduced without unacceptably increasing layout area. The operations of this embodiment are repeated until the pitch of the second virtual grate is adjusted to a value that enables minimization of the number of different spacing sizes between neighboring vertical connection structures without unacceptably increasing layout area.

Figure 11:
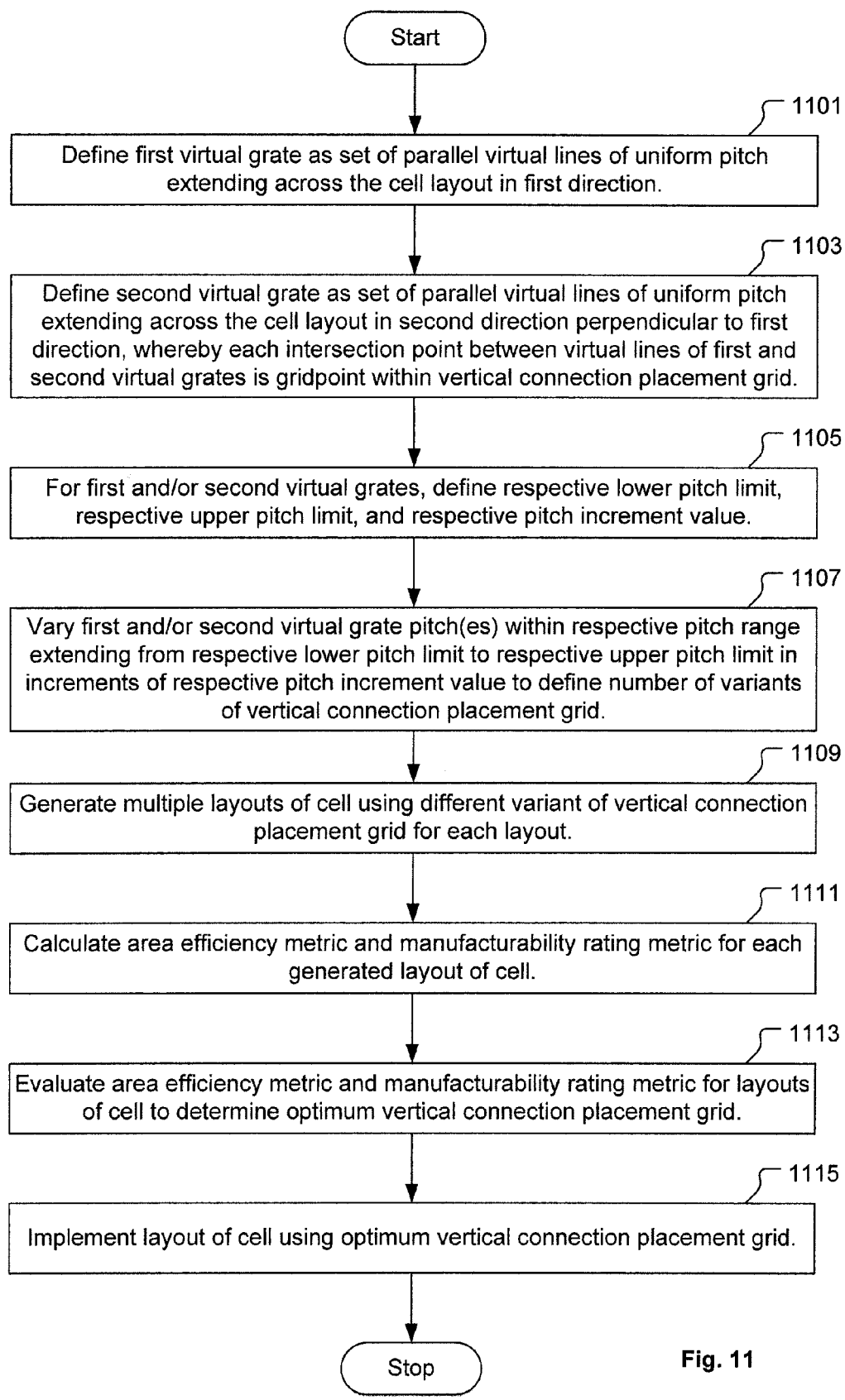
FIG. 11 shows a flowchart of a method for optimizing a cell layout, in accordance with one embodiment of the present invention.

FIG. 11 shows a flowchart of a method for optimizing a cell layout, in accordance with one embodiment of the present invention. The method includes an operation 1101 for defining a first virtual grate as a set of parallel virtual lines of uniform pitch extending across the cell layout in a first direction. The method includes an operation 1103 for defining a second virtual grate as a set of parallel virtual lines of uniform pitch extending across the cell layout in a second direction that is perpendicular to the first direction. Each intersection point between virtual lines of the first and second virtual grates is a gridpoint within a vertical connection placement grid.

The method also includes an operation 1105 for defining a respective lower pitch limit, a respective upper pitch limit, and a respective pitch increment value for either the first virtual grate, the second virtual grate, or both the first and second virtual grates. A pitch range for a given virtual grate extends from the lower pitch limit of the given virtual grate to the upper pitch limit of the given virtual grate in increments of the pitch increment value of the given virtual grate. In one embodiment, the lower pitch limit is defined as a mathematical common multiple of both a gate length and a mask resolution. In one embodiment, the upper pitch limit is defined as a mathematical factor of a wire pitch of any chip level having features that are commonly oriented with either the first or second virtual grate. In one embodiment, the pitch increment value is defined as a mathematical multiple of a mask resolution.

The method further includes an operation 1107 for defining a number of variants of the vertical connection placement grid. Each variant of the vertical connection placement grid corresponds to a different combination of first and second virtual grate pitch values within their respective pitch ranges. An operation 1109 is performed to generate multiple layouts of a cell. Each of the multiple layouts of the cell is generated using a different variant of the vertical connection placement grid. In an operation 1111, both an area efficiency metric and a manufacturability rating metric are calculated for each of the multiple layouts of the cell. In one embodiment, the area efficiency metric is defined as a chip area occupied by the cell layout. In one embodiment, the manufacturability rating metric is defined as a number of different spacing sizes between neighboring vertical connection structures across the vertical connection placement grid. However, in other embodiments different area efficiency and manufacturability rating metrics can be utilized.

The method further includes an operation 1113 for evaluating the area efficiency metric and manufacturability rating metric for the multiple layouts of the cell to determine an optimum vertical connection placement grid. In one embodiment, the optimum vertical connection placement grid is defined by a combination of first and second virtual grate pitch values that minimizes both the area occupied by the cell layout and the number of different spacing sizes between neighboring vertical connection structures. An operation 1115 is then performed to implement the layout of the cell using the optimum vertical connection placement grid.

In one embodiment of the method of FIG. 11, the first virtual grate is used to place linear-shaped gate electrode features in a gate level of the cell layout. In this embodiment, the vertical connection structures are defined as gate electrode contacts. In another embodiment, the vertical connection structures are defined as diffusion contacts.

In yet another embodiment of the method of FIG. 11, both the first and second virtual grates are used to place interconnect wire structures in respective interconnect levels in the cell layout. In this embodiment, the vertical connection structures are defined as vias.

It should be appreciated that the methods for defining and optimizing vertical connection structure grids and placing vertical connection structures thereon, as described herein, provide a systematic approach for limiting layout shape spatial relationships within the layout. Therefore, the method for defining, optimizing, and utilizing vertical connection structure grids as described herein allow for reduction in the quantity of different edge-to-edge lithographic interactions within the layout, thereby increasing the manufacturability of the layout. For instance, in one embodiment, a number of layout shape spatial relationships can be limited to allow for co-optimization between the manufacturing process and design. Additionally, limiting the number of layout shape spatial relationships can enable abstraction of a finite number of allowable layouts, which can benefit layout simulation and/or modeling speed and/or accuracy.

It should be understood that the methods for optimizing cell layouts as described herein and the resulting cell layouts can be stored in a tangible form, such as in a digital format on a computer readable medium. Also, the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for defining a vertical connection layout for a circuit, comprising:

defining a first virtual grate as a set of parallel virtual lines extending across a layout area in a first direction, wherein the virtual lines of the first virtual grate correspond to placement locations for layout features in a lower chip level;

defining a second virtual grate as a set of parallel virtual lines extending across the layout area in a second direction substantially perpendicular to the first direction, wherein the virtual lines of the second virtual grate correspond to placement locations for layout features in a higher chip level, wherein each intersection point between virtual lines of the first and second virtual grates is a gridpoint within a vertical connection placement grid;

operating a computer to place vertical connection structures at a number of gridpoints within the vertical connection placement grid so as to provide electrical connectivity between layout features in the lower and higher chip levels, wherein the computer is operated to place the vertical connection structures so as to minimize a number of different vertical connection structure edge-to-edge spacing sizes between neighboring vertical connection structures across the vertical connection placement grid; and operating the computer to record the placements of the vertical connection structures in a layout file on a computer readable storage medium.

2. The method as recited in claim 1, wherein the layout features in the lower chip level are linear-shaped gate electrode features, and wherein the vertical connection structures are defined as gate electrode contacts.

3. The method as recited in claim 2, wherein a pitch of the first virtual grate is equal to one-half of a center-to-center perpendicular spacing between adjacently placed linear-shaped gate electrode features.

4. The method as recited in claim 1, wherein the vertical connection structures are defined as diffusion contacts.

5. The method as recited in claim 1, wherein both the lower and higher chip levels correspond to respective interconnect levels, and wherein the vertical connection structures are defined as via structures.

6. The method as recited in claim 1, wherein the vertical connection structures are placed so as to minimize an area of the layout.

7. The method as recited in claim 1, further comprising:
(a) systematically adjusting either a pitch of the first virtual grate, a pitch of the second virtual grate, or pitches of both the first and second virtual grates to generate a revised vertical connection placement grid;
(b) revising placement of the vertical connection structures according to the revised vertical connection placement grid;
(c) determining whether the number of different spacing sizes between neighboring vertical connection structures across the revised vertical connection placement grid is reduced without unacceptably increasing layout area; and
(d) repeating operations (a) through (c) until the number of different spacing sizes between neighboring vertical connection structures is minimized without unacceptably increasing layout area.

8. A method for optimizing a cell layout, comprising:
defining a first virtual grate as a set of parallel virtual lines of uniform pitch extending across the cell layout in a first direction;
defining a second virtual grate as a set of parallel virtual lines of uniform pitch extending across the cell layout in a second direction that is perpendicular to the first direction, wherein each intersection point between virtual lines of the first and second virtual grates is a gridpoint within a vertical connection placement grid;
for either the first virtual grate, the second virtual grate, or both the first and second virtual grates, defining a respective lower pitch limit, a respective upper pitch limit, and a respective pitch increment value, wherein a pitch range for a given virtual grate extends from the lower pitch limit of the given virtual grate to the upper pitch limit of the given virtual grate in increments of the pitch increment value of the given virtual grate;
operating a computer to define a number of variants of the vertical connection placement grid, wherein each variant of the vertical connection placement grid corresponds to a different combination of first and second virtual grate pitch values within their respective pitch ranges;
operating the computer to generate multiple layouts of a cell, wherein each of the multiple layouts of the cell is generated using a different variant of the vertical connection placement grid;
operating the computer to calculate for each of the multiple layouts of the cell an area efficiency metric and a manufacturability rating metric;
evaluating the area efficiency metric and manufacturability rating metric for the multiple layouts of the cell to determine an optimum vertical connection placement grid; and
operating the computer to record on a computer readable storage medium the layout of the cell using the optimum vertical connection placement grid.

9. The method as recited in claim 8, wherein the lower pitch limit of a given virtual grate is defined as a mathematical common multiple of both a gate length and a mask resolution.

10. The method as recited in claim 8, wherein the upper pitch limit of a given virtual grate is defined as a mathematical factor of a wire pitch of any chip level having features that are commonly oriented with either the first virtual grate or the second virtual grate.

11. The method as recited in claim 8, wherein the pitch increment value of a given virtual grate is defined as a mathematical multiple of a mask resolution.

12. The method as recited in claim 8, wherein the area efficiency metric is defined as a chip area occupied by the cell layout, and wherein the manufacturability rating metric is defined as a number of different spacing sizes between neighboring vertical connection structures across the vertical connection placement grid.

13. The method as recited in claim 12, wherein the optimum vertical connection placement grid is defined by a combination of first and second virtual grate pitch values that minimizes both the area occupied by the cell layout and the number of different spacing sizes between neighboring vertical connection structures.

14. The method as recited in claim 8, wherein the first virtual grate is used to place linear-shaped gate electrode features in a gate level of the cell layout, and wherein the vertical connection structures are defined as gate electrode contacts.

15. The method as recited in claim 8, wherein the vertical connection structures are defined as diffusion contacts.

16. The method as recited in claim 8, wherein both the first and second virtual grates are used to place interconnect wire structures in respective interconnect levels in the cell layout, and wherein the vertical connection structures are defined as vias.

17. The method as recited in claim 8, wherein the first virtual grate is associated with both the vertical connection placement grid and another level of the cell layout, and wherein the second virtual grate is associated with the vertical connection placement grid only, the second virtual grate defined to regularize spacing between vertical connection structures in the direction of extent of the first virtual grate.

18. The method as recited in claim 8, wherein each of the first and second virtual grates is associated with the vertical connection placement grid only, the first and second virtual grates defined to regularize vertical connection structure placements and spacings therebetween within the cell layout.

19. The method as recited in claim 8, wherein the optimum vertical connection placement grid is defined by a combination of first and second virtual grate pitch values that minimizes a number of different spatial relationships between layout shapes to be lithographically resolved.

20. The method as recited in claim 8, wherein the optimum vertical connection placement grid is defined by a combination of first and second virtual grate pitch values that provide for co-optimization between manufacturing and design processes.

21. The method as recited in claim 8, wherein the optimum vertical connection placement grid is defined by a combination of first and second virtual grate pitch values that provide for abstraction of a finite number of allowable layouts to improve layout simulation, modeling, accuracy, or any combination thereof.

22. A semiconductor chip, comprising:
   a cell defined to include a number of vertical connection structures placed in accordance with a vertical connection placement grid,
   wherein the vertical connection placement grid is defined by a first virtual grate and a second virtual grate, the first virtual grate defined by a set of parallel virtual lines extending across a layout of the cell in a first direction, the second virtual grate defined by a set of parallel virtual lines extending across the layout of the cell in a second direction substantially perpendicular to the first direction, wherein each intersection point between virtual lines of the first and second virtual grates is a gridpoint within the vertical connection placement grid,
   wherein the virtual lines of the first virtual grate correspond to potential placement locations for layout features in a particular chip level,
   wherein the virtual lines of the second virtual grate correspond to potential placement locations for layout features in another chip level different than the particular chip level associated with the first virtual grate,
   wherein vertical connection structures are placed at a number of gridpoints within the vertical connection placement grid so as to provide electrical connectivity between layout features in the chip levels associated with the first and second virtual grates, and
   wherein the vertical connection structures are placed so as to minimize a number of different vertical connection structure edge-to-edge spacing sizes between neighboring vertical connection structures across the layout of the cell and so as to minimize a layout area of the cell.

23. The semiconductor chip as recited in claim 22, wherein the layout features in the chip level associated with the first virtual grate are linear-shaped gate electrode features, and wherein the vertical connection structures are defined as gate electrode contacts.

24. The semiconductor chip as recited in claim 22, wherein the vertical connection structures are defined as diffusion contacts.

25. The semiconductor chip as recited in claim 22, wherein both chip levels associated with the first and second virtual grates correspond to respective interconnect levels, and wherein the vertical connection structures are defined as via structures.

26. The semiconductor chip as recited in claim 22, wherein a number of virtual lines of the first virtual grate are not occupied by layout features within the chip level corresponding to the first virtual grate.

27. The semiconductor chip as recited in claim 26, wherein an occupancy versus vacancy of the virtual lines of the first virtual grate by layout features is defined according to a pattern that repeats across the chip level corresponding to the first virtual grate.

28. The semiconductor chip as recited in claim 27, wherein a number of virtual lines of the second virtual grate are not occupied by layout features within the chip level corresponding to the second virtual grate.

29. The semiconductor chip as recited in claim 28, wherein an occupancy versus vacancy of the virtual lines of the second virtual grate by layout features is defined according to a pattern that repeats across the chip level corresponding to the second virtual grate.

* * * * *